(12) United States Patent
Kearns

(10) Patent No.: US 11,940,800 B2
(45) Date of Patent: Mar. 26, 2024

(54) NAVIGATIONAL CONTROL OF AUTONOMOUS CLEANING ROBOTS

(71) Applicant: iRobot Corporation, Bedford, MA (US)

(72) Inventor: Justin H. Kearns, Los Angeles, CA (US)

(73) Assignee: iRobot Corporation, Bedford, MA (US)

( * ) Notice: Subject to any disclaimer, the term of this patent is extended or adjusted under 35 U.S.C. 154(b) by 199 days.

(21) Appl. No.: 17/239,166

(22) Filed: Apr. 23, 2021

(65) Prior Publication Data

US 2022/0342421 A1 Oct. 27, 2022

(51) Int. Cl.
G05D 1/00 (2006.01)

(52) U.S. Cl.
CPC ......... G05D 1/0214 (2013.01); G05D 1/0219 (2013.01); G05D 1/0229 (2013.01)

(58) Field of Classification Search
CPC .. G05D 1/0214; G05D 1/0219; G05D 1/0229; G05D 2201/0203; G05B 15/02; A47L 11/4011; A47L 2201/04
See application file for complete search history.

(56) References Cited

U.S. PATENT DOCUMENTS

| | | | |
|---|---|---|---|
| 9,370,290 B2 * | 6/2016 | Dooley | A47L 11/4088 |
| 10,571,925 B1 | 2/2020 | Zhang et al. | |
| 2002/0116089 A1 * | 8/2002 | Kirkpatrick | |
| 2005/0085947 A1 * | 4/2005 | Aldred | |
| 2006/0149465 A1 | 7/2006 | Park et al. | |
| 2008/0091305 A1 | 4/2008 | Svendsen et al. | |
| 2010/0037418 A1 * | 2/2010 | Hussey | G05D 1/0234 901/1 |
| 2011/0202175 A1 * | 8/2011 | Romanov | A47L 11/4036 700/250 |
| 2012/0173070 A1 | 7/2012 | Schnittman | |
| 2014/0129027 A1 * | 5/2014 | Schnittman | G05D 1/0242 700/253 |

(Continued)

FOREIGN PATENT DOCUMENTS

| CN | 111026121 A | * | 4/2020 | |
|---|---|---|---|---|
| CN | 112155486 A | * | 1/2021 | A47L 11/40 |

(Continued)

OTHER PUBLICATIONS

CN-111026121-A, (Year: 2020), English Translation.*

(Continued)

*Primary Examiner* — Anne Marie Antonucci
*Assistant Examiner* — Amelia Vorce
(74) *Attorney, Agent, or Firm* — Fish & Richardson P.C.

(57) ABSTRACT

An autonomous cleaning robot includes a controller configured to execute instructions to perform operations including moving the autonomous cleaning robot along a first portion of a path toward a waypoint, detecting, with a ranging sensor of the autonomous cleaning robot, an obstacle along the path between the first portion of the path and a second portion of the path, navigating the autonomous cleaning robot about the obstacle along a trajectory that maintains at least a clearance distance between the autonomous cleaning robot and the obstacle, and moving the autonomous cleaning robot along the second portion of the path.

35 Claims, 27 Drawing Sheets

(56) References Cited

U.S. PATENT DOCUMENTS

| | | |
|---|---|---|
| 2015/0166060 A1 | 6/2015 | Smith |
| 2017/0203446 A1 | 7/2017 | Dooley et al. |
| 2017/0332862 A1* | 11/2017 | Jun ..................... A47L 11/4069 |
| 2019/0133395 A1* | 5/2019 | Jung ..................... G05D 1/0219 |
| 2019/0380551 A1 | 12/2019 | Szatmary et al. |
| 2020/0004253 A1* | 1/2020 | Gabardos ............. G05D 1/0276 |
| 2020/0013287 A1* | 1/2020 | Kaneko ................ H04W 4/029 |
| 2020/0047337 A1* | 2/2020 | Williams ................ B25J 9/163 |
| 2020/0047343 A1* | 2/2020 | Bal ...................... G05D 1/0219 |
| 2020/0069125 A1* | 3/2020 | Gritsenko .............. A47L 9/009 |
| 2021/0154840 A1* | 5/2021 | Vogel .................... B25J 9/1666 |
| 2021/0191422 A1* | 6/2021 | Knuth, Jr. ............ G05D 1/0221 |
| 2021/0200219 A1* | 7/2021 | Gaschler ............. G05D 1/0274 |
| 2021/0216070 A1* | 7/2021 | VanKampen ......... A47L 9/2805 |
| 2021/0341928 A1* | 11/2021 | Sampaio Martins Pereira ............ A47L 9/2852 |
| 2022/0022715 A1* | 1/2022 | Park ........................ B25J 19/02 |
| 2022/0287218 A1* | 9/2022 | Yuasa .................... B60K 31/00 |

FOREIGN PATENT DOCUMENTS

| | | | | |
|---|---|---|---|---|
| CN | 112641369 A | * | 4/2021 | ............... A47L 1/02 |
| EP | 1963940 A2 | * | 9/2008 | .............. A47L 11/24 |
| KR | 101598385 B1 | * | 3/2016 | ............ B25J 9/1666 |
| KR | 20200092285 A | * | 8/2020 | .......... B25J 19/0075 |
| WO | WO 2007065030 | | 6/2007 | |
| WO | WO-2019040653 A1 | * | 2/2019 | ........... E04H 4/1654 |
| WO | WO-2021141396 A1 | * | 7/2021 | .......... A47L 11/4061 |

OTHER PUBLICATIONS

International Search Report and Written Opinion in International Appln. No. PCT/US2022/019159, dated Jun. 24, 2022, 12 pages.
International Preliminary Report on Patentability in International Appln. No. PCT/US2022/019159, dated Nov. 2, 2023, 7 pages.

* cited by examiner

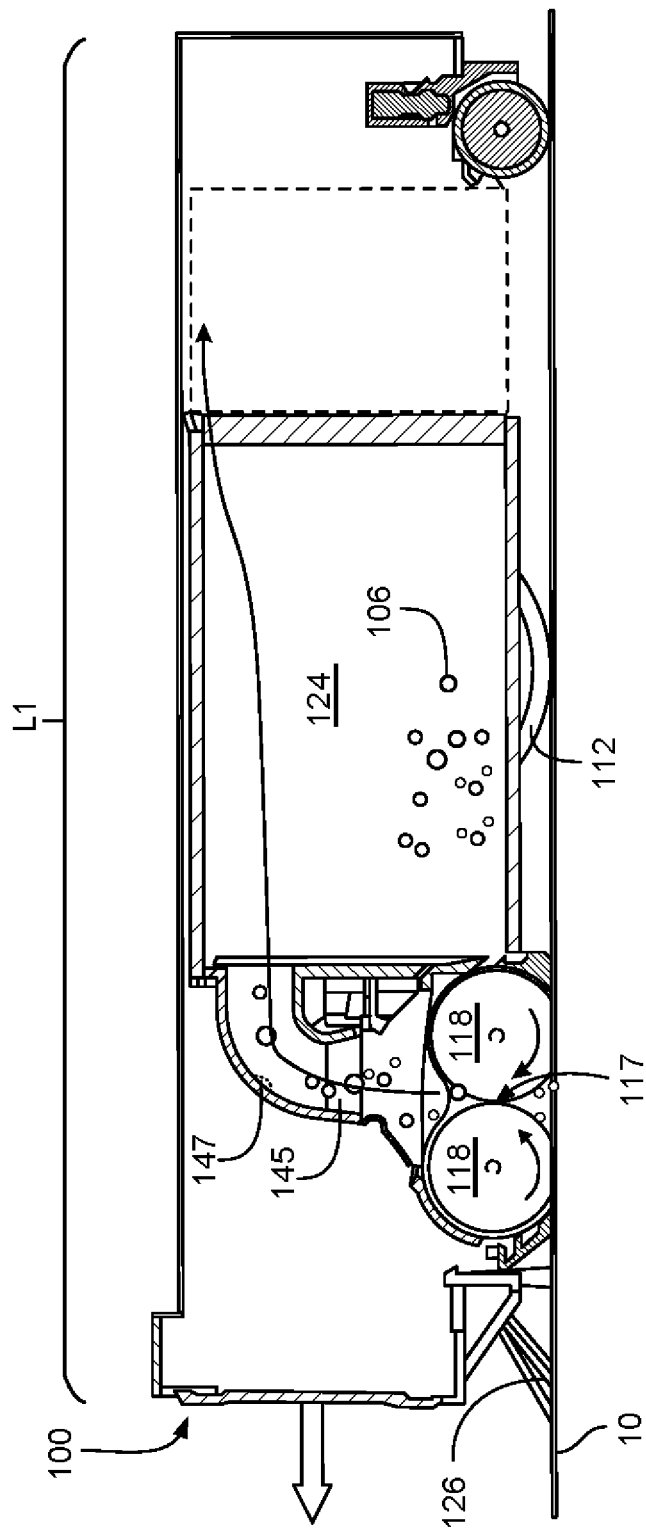

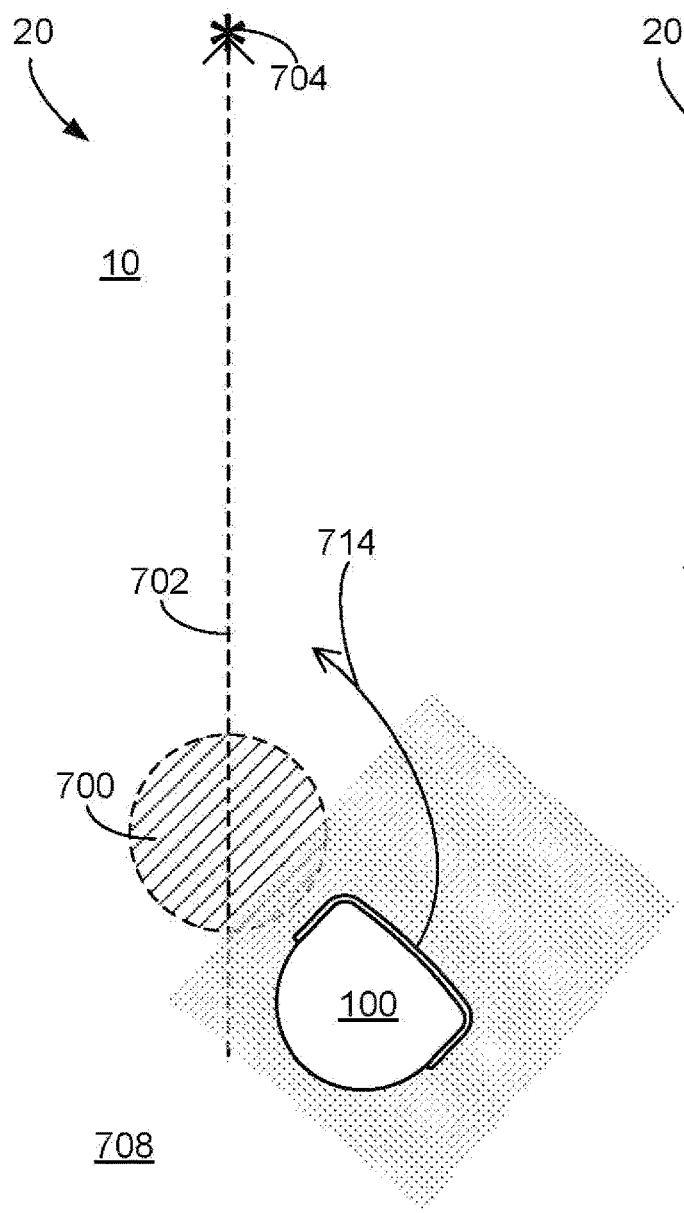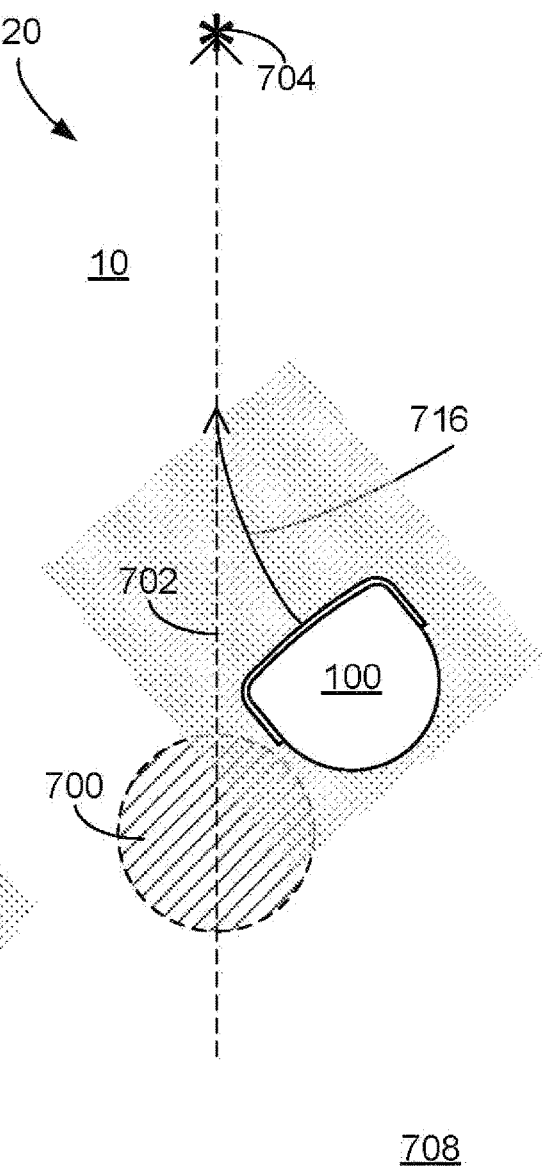
FIG. 7C　　　　　FIG. 7D

NAVIGATIONAL CONTROL OF AUTONOMOUS CLEANING ROBOTS

TECHNICAL FIELD

This specification relates to navigational control of autonomous mobile robots and, in particular, autonomous cleaning robots.

BACKGROUND

An autonomous mobile robot can autonomously move about a space to perform a task. The autonomous mobile robot can include a controller that navigates the autonomous mobile robot in response to input. For example, the autonomous mobile robot can include sensors for detecting objects in the space. The sensors can produce sensor signals in response to detection of objects in the space, and the controller can receive these sensor signals as input for controlling navigation of the autonomous mobile robot.

The task performed by the autonomous mobile robot as the autonomous mobile robot is navigated about the space can vary. For example, the autonomous mobile robot can be a cleaning robot (e.g., to vacuum, sweep, scrub, or mop a floor surface in the space) or a patrol robot (e.g., to observe objects in the space).

SUMMARY

This disclosure describes systems and methods for navigating an autonomous mobile robot about a space to avoid an obstacle in the space. Certain autonomous mobile robots can be cleaning robots. During operation, the cleaning robots can bump into obstacles such as chair legs, or other items of furniture as they clean the home. Such bumping may be necessary to clean the area directly adjacent to the obstacles. However, such bumping may create noise that can cause discomfort for users. It may be possible to avoid such bumping of obstacles by implementing a "gentle mode" whereby the cleaning robot maintains a distance from the obstacles as it cleans to reduce bumping of obstacles and subsequent noise that would otherwise occur. The reduced bumping can prevent motion of the obstacle in response to the bumping, and can also reduce noise produced due to the contact.

In one aspect, an autonomous cleaning robot includes a drive system operable to move the autonomous cleaning robot about a floor surface. The autonomous cleaning robot includes a cleaning inlet on a bottom portion of the autonomous cleaning robot, where the autonomous cleaning robot is configured to draw debris into the autonomous cleaning robot through the cleaning inlet. The autonomous cleaning robot includes a ranging sensor directed toward a portion of the floor surface forward of the autonomous cleaning robot and configured to measure a position of an obstacle on the portion of the floor surface relative to the autonomous cleaning robot. The autonomous cleaning robot includes a controller configured to execute instructions to perform operations. The operations include moving the autonomous cleaning robot along a first portion of a path toward a waypoint, detecting, with the ranging sensor, the obstacle along the path between the first portion of the path and a second portion of the path, navigating the autonomous cleaning robot about the obstacle along a trajectory that maintains at least a clearance distance between the autonomous cleaning robot and the obstacle, and moving the autonomous cleaning robot along the second portion of the path.

In another aspect, a method includes while moving an autonomous cleaning robot along a first portion of a path toward a waypoint, detecting, with an ranging sensor of the autonomous cleaning robot, an obstacle forward of the autonomous cleaning robot along the path between the first portion of the path and a second portion of the path. The method includes navigating the autonomous cleaning robot about the obstacle. The method includes moving the autonomous cleaning robot along the second portion of the path.

In another aspect, one or more non-transitory computer readable media storing instructions executable by one or more processing devices and upon such execution cause the one or more processing devices to perform operations is featured. The operations include while moving an autonomous cleaning robot along a first portion of a path toward a waypoint, detecting, with an ranging sensor of the autonomous cleaning robot, an obstacle forward of the autonomous cleaning robot along the path between the first portion of the path and a second portion of the path. The operations include navigating the autonomous cleaning robot about the obstacle. The operations include moving the autonomous cleaning robot along the second portion of the path.

In another aspect, an autonomous cleaning robot includes a drive system operable to move the autonomous cleaning robot about a floor surface and a cleaning inlet on a bottom portion of the autonomous cleaning robot. The autonomous cleaning robot is configured to draw debris into the autonomous cleaning robot through the cleaning inlet. The autonomous cleaning robot includes a sensor system to measure a position of an obstacle on the portion of the floor surface relative to the autonomous cleaning robot. The autonomous cleaning robot includes a controller configured to execute instructions to perform operations. The operations include moving the autonomous cleaning robot about the floor surface in a gentle mode in which the autonomous cleaning robot maintains at least a clearance distance between the autonomous cleaning robot and the obstacle.

Implementations may include one or more of the following features.

In some implementations, the method or the operations include receiving a user command to operate the autonomous cleaning robot in the gentle mode in a cleaning mission of the autonomous cleaning robot.

In some implementations, the gentle mode corresponds to a first obstacle avoidance mode, and the obstacle corresponds to a first obstacle. The operations can further include moving the autonomous cleaning robot about the floor surface in a second obstacle avoidance mode in which the autonomous cleaning robot contacts a second obstacle to move about the second obstacle.

In some implementations, the sensor system of the autonomous cleaning robot includes a ranging sensor to measure the position of the obstacle on the portion of the floor surface relative to the autonomous cleaning robot.

In some implementations, the method or the operations include generating a local map based on at least sensor data generated by a sensor system of the autonomous cleaning robot. The local map can be indicative of at least features detectable by the sensor system of the autonomous cleaning robot at a current location of the autonomous cleaning robot. Navigating the autonomous cleaning robot about the obstacle can include navigating the autonomous cleaning robot about the obstacle based on at least the local map. Moving the autonomous cleaning robot about the floor surface in the gentle mode can include moving the autonomous cleaning robot about the floor surface in the gentle mode based on at least the local map.

In some implementations, the portion of the floor surface corresponds to an area on the floor surface forward of the autonomous cleaning robot and extending across at least a width of the autonomous cleaning robot.

In some implementations, the method or the operations include initiating a coverage routine in which the autonomous cleaning robot moves along a plurality of rows. The path can correspond to a row of the plurality of rows.

In some implementations, the method or the operations include initiating a relocation behavior in which the autonomous cleaning robot moves from a first room to a second room along the path.

In some implementations, navigating the autonomous cleaning robot about the obstacle includes determining a plurality of selectable alternative trajectories to avoid the detected obstacle, selecting, from the plurality of selectable alternative trajectories, the trajectory based on at least distances between the plurality of selectable alternative trajectories and the waypoint, and navigating the autonomous cleaning robot along the selected trajectory. In some implementations, the method or the operations further include repeatedly performing iterations of the determining, the selecting, and the navigating until a condition is satisfied. In some implementations, the condition corresponds to a position of the autonomous cleaning robot being on the path to the waypoint. In some implementations, the condition corresponds to a minimum distance between a position of the autonomous cleaning robot and the path exceeding a threshold. In some implementations, the condition corresponds to an amount of time elapsed during the iterations exceeding a threshold. In some implementations, selecting the trajectory of the plurality of selectable alternative trajectories based on at least the distances between the plurality of selectable alternative trajectories and the waypoint includes computing scores for the plurality of selectable alternative trajectories as a function of at least the distances. In some implementations, the distances are first distances, and computing the scores includes computing the scores for the plurality of selectable alternative trajectories as a function of at least (i) the first distances and (ii) second distances between the plurality of selectable alternative trajectories and the path. In some implementations, computing the scores includes computing the scores for the plurality of selectable alternative trajectories as a function of at least (i) the first distances, (ii) the second distances, and (iii) headings of the plurality of selectable alternative trajectories. In some implementations, the method or the operations further include repeatedly performing iterations of the determining, the selecting, and the navigating. In some implementations, the plurality of selectable alternative trajectories includes one or more template trajectories that are selectable during the selecting of each of the iterations. In some implementations, moving the autonomous cleaning robot along the path toward the waypoint includes moving the autonomous cleaning robot along the path at a first speed. The one or more template trajectories can include at least one of a first template trajectory in which the autonomous cleaning robot is moved along the path at a second speed less than the first speed, a second template trajectory in which the autonomous cleaning robot is rotated in place, or a third template trajectory in which the autonomous cleaning robot is moved along an arc. In some implementations, the plurality of selectable alternative trajectories includes a selectable alternative trajectory corresponding to the selected trajectory of a last iteration of the iterations modified with an adjustment. In some implementations, the plurality of selectable alternative trajectories includes a trajectory with a speed and a heading, the speed and the heading corresponding to a current speed and a current heading of the autonomous cleaning robot with an adjustment.

In some implementations, navigating the autonomous cleaning robot about the obstacle includes rotating the autonomous cleaning robot in place. In some implementations, navigating the autonomous cleaning robot about the obstacle includes detecting the presence of the obstacle in a first area surrounding the autonomous cleaning robot, and detecting the presence of the obstacle in a second area offset from the first area. In some implementations, rotating the autonomous cleaning robot in place includes rotating the autonomous cleaning robot in place away from the second area in response to detecting the presence of the obstacle in the first area and the second area. In some implementations, navigating the autonomous cleaning robot about the obstacle includes detecting the presence of the obstacle in a first area surrounding the autonomous cleaning robot, detecting the presence of the obstacle in a second area offset from the first area, and moving the autonomous cleaning robot away from the obstacle in response to detecting the presence of the obstacle in the first area and the second area. Rotating the autonomous cleaning robot in place can include rotating the autonomous cleaning robot in place after moving the autonomous cleaning robot away from the obstacle.

In some implementations, the method or the operations include initiating an edge following mode to move the autonomous cleaning robot along an edge of another obstacle above the floor surface, and maintaining at least the clearance distance between the autonomous cleaning robot and the other obstacle as the autonomous cleaning robot is moved along the edge. In some implementations, maintaining at least the clearance distance between the autonomous cleaning robot and the other obstacle includes determining edge following trajectories at a first frequency, determining obstacle avoidance trajectories at a second frequency less than the first frequency, determining that one of the edge following trajectories results in contact between the autonomous cleaning robot and the other obstacle, and navigating the autonomous cleaning robot along a selected obstacle avoidance trajectory of the obstacle avoidance trajectories in response to determining that one of the edge following trajectories results in contact between the autonomous cleaning robot and the other obstacle. In some implementations, the method or the operations include initiating another edge following mode in which the autonomous cleaning robot is moved along an edge based on detection of the edge using a bump sensor of the autonomous cleaning robot.

Advantages of implementations may include those described below and elsewhere in this disclosure.

First, implementations of the systems and methods described in this disclosure can improve navigation of autonomous mobile robots relative to obstacles above floor surfaces in a space. For example, an autonomous mobile robot can be navigated relative to the obstacle without contacting the obstacle, thereby reducing impact on the obstacle. The reduced impact can prevent motion of the obstacle in response to the contact between the autonomous mobile robot and the obstacle, and can also reduce noise produced due to the contact.

Second, implementations of the systems and methods described in this disclosure can improve the efficiency of performing tasks in the space by autonomous mobile robots. For example, an autonomous mobile robot can be navigated along a planned path that efficiently allows the autonomous mobile robot to move to a waypoint and perform the task along the planned path. In implementations in which the autonomous mobile robot is a cleaning robot, the task corresponds to a cleaning task. If an obstacle blocks the planned path, the systems and method described in this disclosure can provide an efficient trajectory (e.g., optimizing for time or distance traveled while along a trajectory that deviates from the planned path) for avoiding the obstacle.

Third, implementations of the systems and methods described in this disclosure can allow the autonomous mobile robots to behave in ways that can be more consistent with expectations of human users in the space. For example, the ranging sensor of the autonomous mobile robot allows the autonomous mobile robot to detect an obstacle ahead of the autonomous mobile robot and therefore react to the obstacle before contacting the obstacle. The reaction of the autonomous mobile robot can provide the appearance of intelligence to the human users. In particular, the autonomous mobile robot can be navigated in a way that can be less surprising to human users observing the behaviors of the autonomous mobile robot.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 2 is a side view of an autonomous cleaning robot moving across a floor surface.

FIGS. 7A-7F are top views of an autonomous cleaning robot moving along a path and moving around an obstacle.

DETAILED DESCRIPTION

Figure 1A:
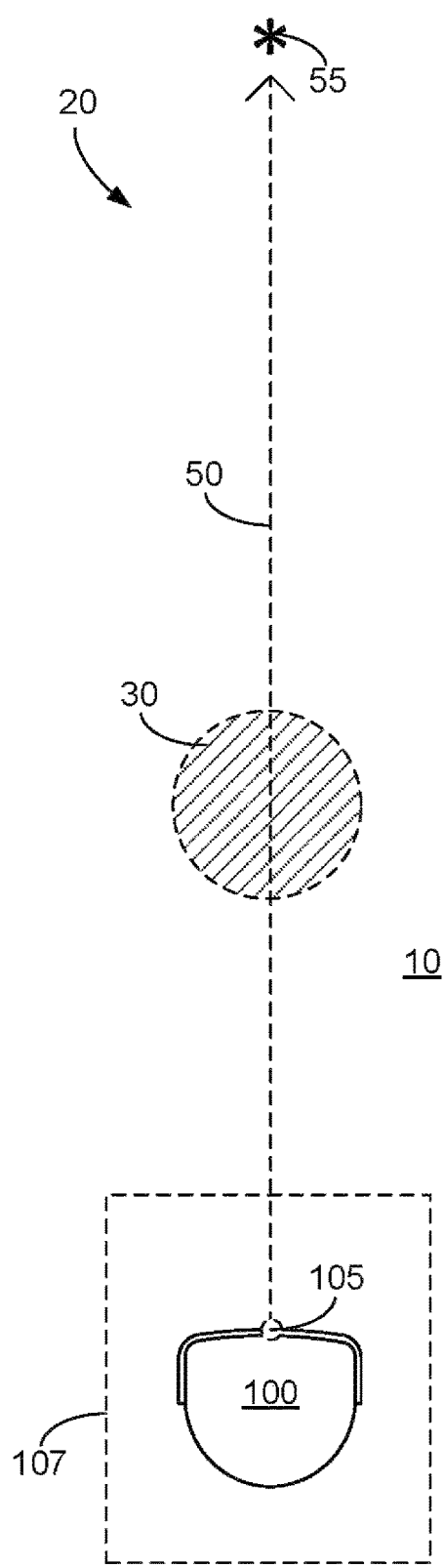
FIG. 1A-1B are top views of an autonomous cleaning robot navigating about a space.

As illustrated in FIG. 1A, an autonomous cleaning robot 100 is configured to move about a floor surface 10 in a space 20 with an obstacle 30. The robot 100 can be controlled (e.g., by a controller of the robot 100, not shown in FIG. 1A) to move along a planned path 50 to a waypoint 55 for the robot 100. The planned path 50 can be part of a navigational plan for the robot 100 to perform a task in the space 20, e.g., to cover the interior of a room in the space 20 to perform the task of cleaning the floor surface 10 in the space 20. The robot 100 includes a sensor system to detect objects in a vicinity of the robot 100. For example, the robot 100 can include a ranging sensor 105 that can generate data indicative of objects in front of the robot 100. The information generated by the sensor system can be used to generate a local map 107 indicating locations of these objects relative to the robot 100.

Figure 1B:
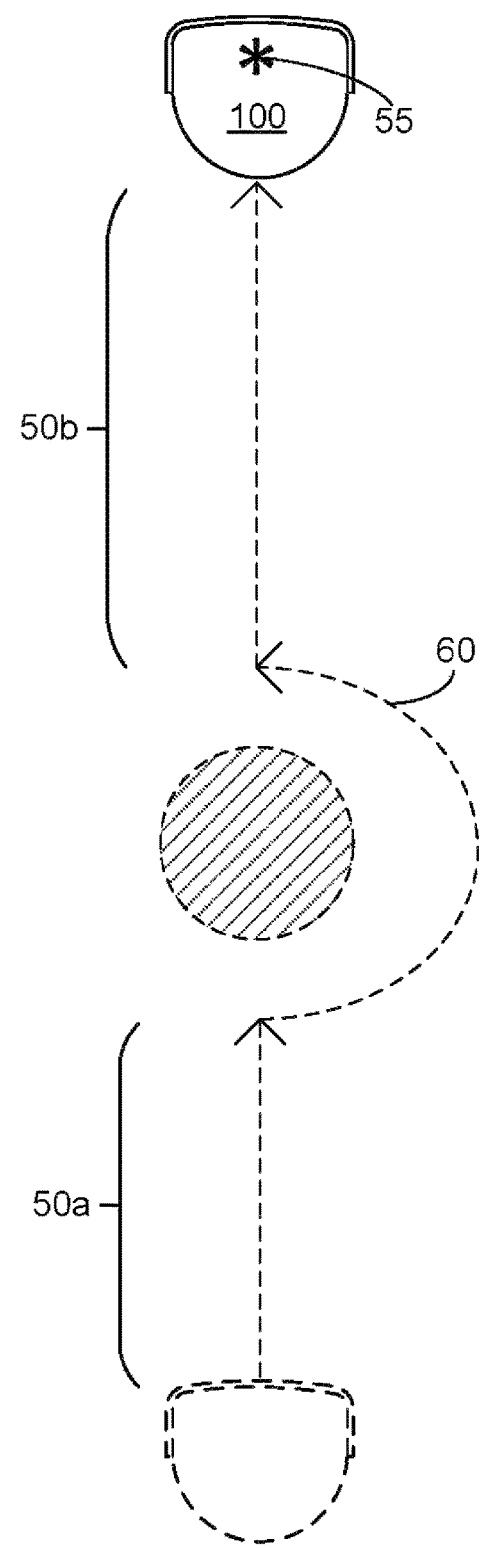

In the example shown in FIGS. 1A-1B, the obstacle 30 blocks the planned path 50. As the robot 100 moves down a first portion 50a of the path 50, the robot 100 can detect the obstacle 30 using the ranging sensor 105. The robot 100, to avoid the obstacle so that the robot 100 can continue on the planned path 50, can initiate an obstacle avoidance behavior in response to detecting the obstacle 30 using the ranging sensor 105. In the obstacle avoidance behavior, the robot 100 can maintain at a least a clearance distance between the robot 100 and the obstacle 30. For example, the robot 100 can relative to the obstacle 30 to avoid contacting the obstacle 30. In this obstacle avoidance behavior, the robot 100 can select an alternative trajectory 60 that avoids the obstacle 30 and allows the robot 100 to return to the planned path 50 and continue to follow the planned path 50 to the waypoint 55 along a second portion 50b of the planned path 50. As discussed in this disclosure, systems and methods described in this disclosure can allow the robot 100 to intelligently deviate from the planned path 50 in a way that avoids contact with the obstacle 30 and that minimizes disruption to the overall navigational plan for the robot 100 to perform the cleaning task. Further, as discussed in this disclosure, the robot 100 can be operated in an obstacle avoidance mode that avoids contact with obstacles in the space 20. The obstacle avoidance mode can be a gentle mode in which the robot 100 is navigated along trajectories that are specifically generated to avoid contact with obstacles and maintain at least a clearance distance from the obstacles.

Examples of Autonomous Mobile Robots

Figure 3A:
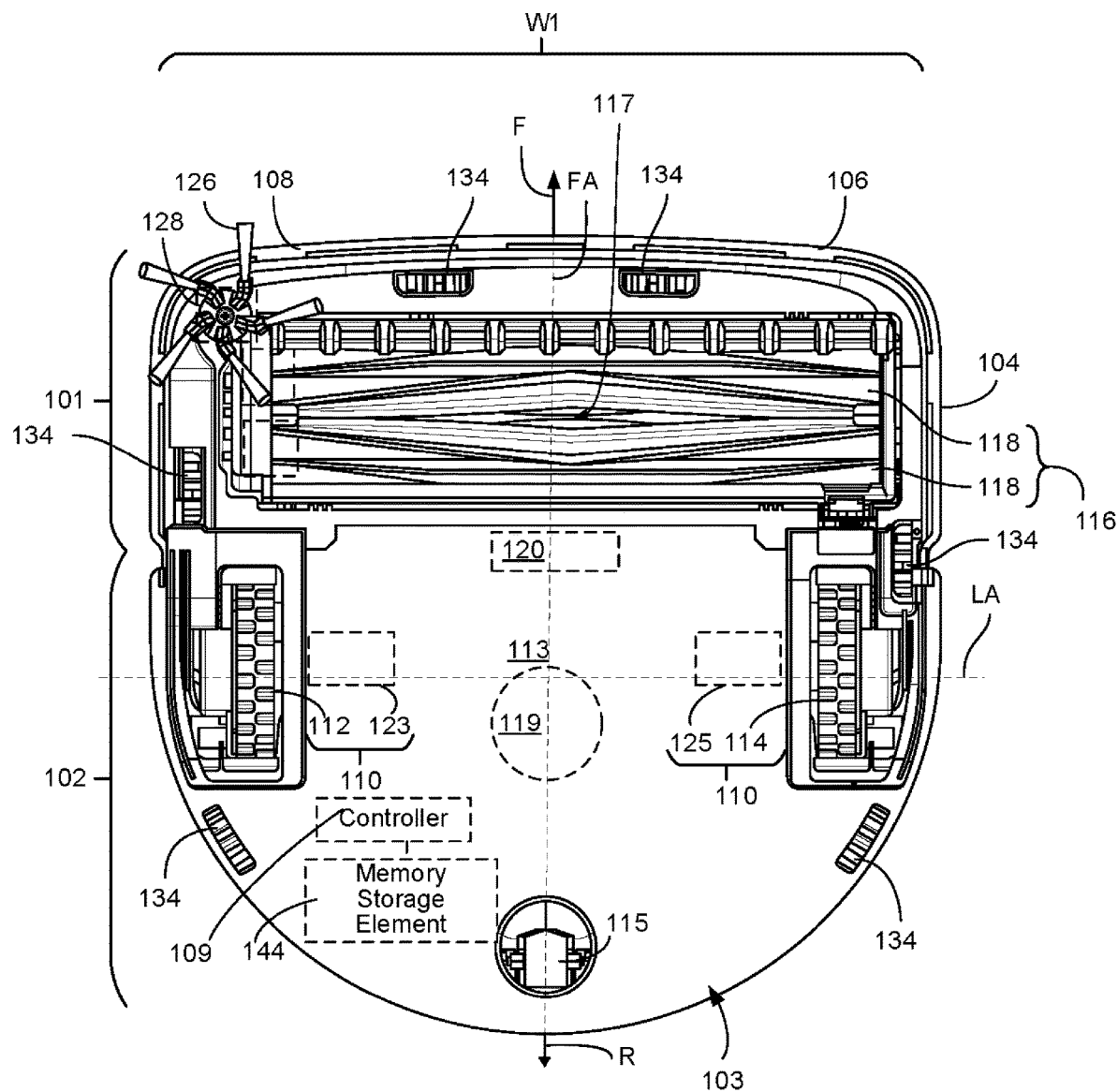
FIGS. 3A-3B are bottom and front perspective views of an autonomous cleaning robot.
Figure 3B:
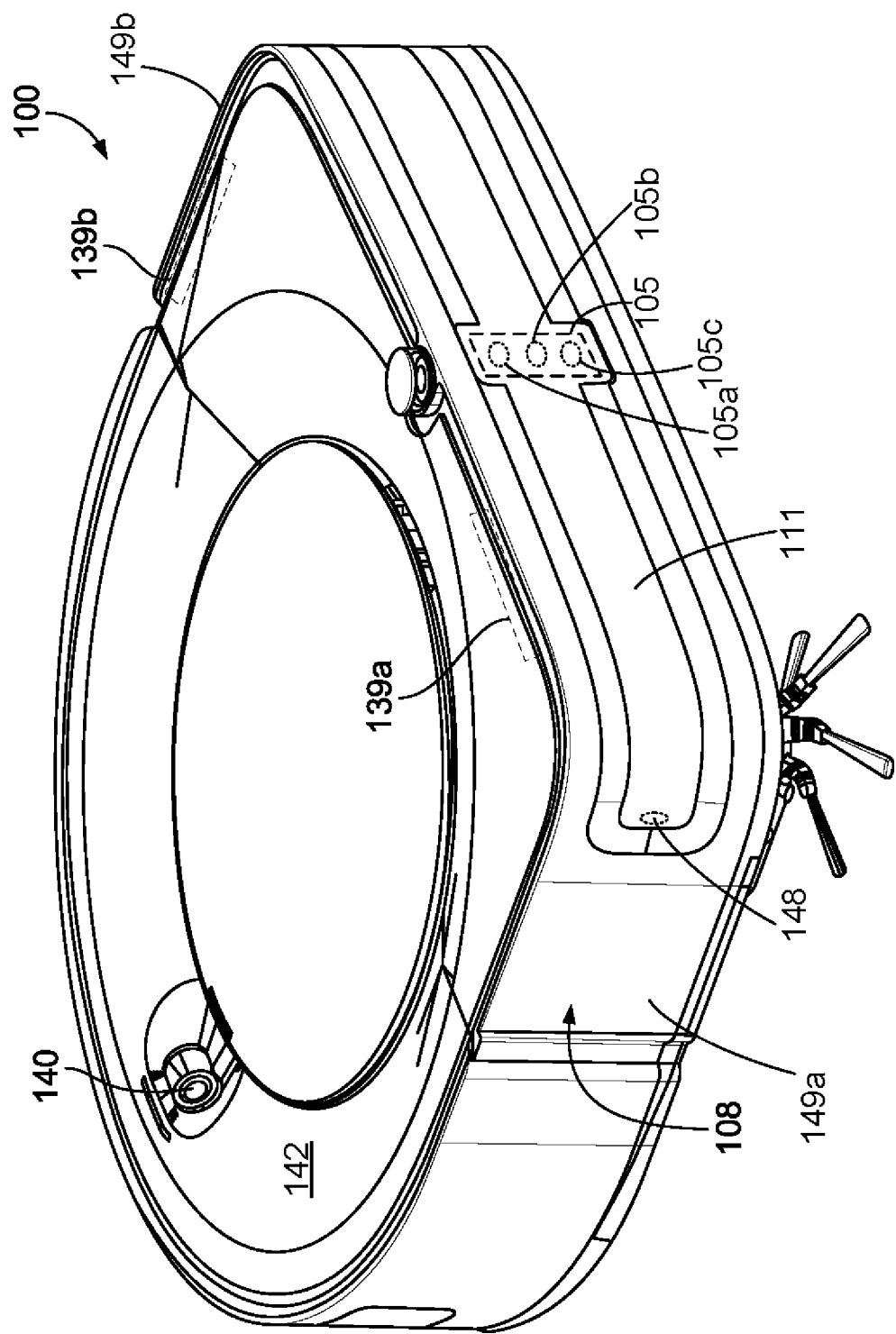

Autonomous cleaning robots can vary in implementations. FIGS. 2 and 3A-3B illustrate examples of the robot 100. Referring to FIG. 2, the robot 100 collects debris 106 from the floor surface 10 as the robot 100 traverses the floor surface 10.

Referring to FIG. 3A, the robot 100 includes a forward portion 101 and a rearward portion 102. A robot housing infrastructure 103 can define an outer perimeter 104 of the robot 100. The part of the outer perimeter 104 on the forward portion 101 of the robot 100 can be substantially rectangular, and the part of the outer perimeter 104 on the rearward portion 102 of the robot 100 can be substantially semicircular. The housing infrastructure 103 can include a bumper 108 on the forward portion 101 of the robot 100. When the robot 100 contacts an object on the floor surface 10 as the robot 100 is moving in a forward drive direction F about the floor surface 10, the robot 100 contacts the object with the bumper 108. In this regard, the bumper 108 can include a mechanism to reduce an impact force applied to the object due to the contact. For example, the bumper 108 can include an elastomeric layer along an outer surface of the bumper 108, or can be a movable bumper 108.

In some implementations, the robot 100 is a household robot that has a small profile so that the robot 100 can fit under furniture within a home. For example, a height H1 (shown in FIG. 2) of the robot 100 relative to the floor surface is, for example, no more than 13 centimeters. The robot 100 is also compact. An overall length L1 (shown in FIG. 2) of the robot 100 and an overall width W1 (shown in FIG. 3A) can each be between 15 and 60 centimeters, e.g., between 15 and 30 centimeters, 20 and 30 centimeters, 25 and 35 centimeters, 20 and 40 centimeters, 30 and 40 centimeters, 40 and 50 centimeters, or 50 and 60 centimeters. The overall width W1 can correspond to a width of the housing infrastructure 103 of the robot 100, e.g., a width of the forward portion 101 of the robot 100 and a width of the rearward portion 102.

The robot 100 includes a drive system 110 including one or more drive wheels. The drive system 110 is configured to move the robot 100 about the floor surface 10 in the space 20. The drive system 110 further includes one or more electric motors including electrically driven portions forming part of electrical circuitry of the robot 100. The housing infrastructure 103 supports the electrical circuitry, including at least a controller 109, within the robot 100.

The drive system 110 is operable to propel the robot 100 across the floor surface 10. The robot 100 can be propelled in the forward drive direction F or a rearward drive direction R. The robot 100 can also be propelled such that the robot 100 turns in place or turns while moving in the forward drive direction F or the rearward drive direction R. In the example depicted in FIGS. 2 and 3A, the robot 100 includes drive wheels 112, 114 extending through a bottom portion 113 of the housing infrastructure 103. The drive wheels 112, 114 are rotated by motors 123, 125 to cause movement of the robot 100 along the floor surface 10. The drive wheels 112, 114 are independently controllable by the controller 109, allowing the controller 109 to a select a velocity and/or an acceleration for each of the drive wheels 112, 114. The independent control of the drive wheels 112, 114 enables the controller 109 to select from several different trajectories for the robot 100, e.g., turning the robot 100 in place, moving the robot 100 along an arc, moving in a straight line in the forward drive direction F, moving the robot in a straight line in the rearward drive direction R, and other movements that possible from independent control of two drive wheels on left and right portions of an autonomous mobile robot.

The robot 100 further includes a passive caster wheel 115 extending through the bottom portion 113 of the housing infrastructure 103. The caster wheel 115 is not powered. Together, the drive wheels 112 and the caster wheel 115 cooperate to support the housing infrastructure 103 above the floor surface 10. For example, the caster wheel 115 is disposed along the rearward portion 102 of the housing infrastructure 103, and the drive wheels 112 are disposed forward of the caster wheel 115.

In the example depicted in FIGS. 2, 3A, and 3B, the robot 100 is an autonomous mobile floor cleaning robot that includes a cleaning system 116 (shown in FIG. 3A) operable to clean the floor surface 10. The cleaning system 116 is configured to clean the floor surface 10 in the space 20 as the drive system 110 moves the robot 100 about the floor surface 10. For example, the robot 100 is a vacuum cleaning robot in which the cleaning system 116 is operable to clean the floor surface 10 by ingesting debris 106 (shown in FIG. 2) from the floor surface 10. The cleaning system 116 includes a cleaning inlet 117 through which debris is collected by the robot 100. The cleaning inlet 117 is positioned forward of a center of the robot 100, and along the forward portion 101 of the robot 100 between the side surfaces of the forward portion 101.

The cleaning system 116 includes one or more rotatable members, e.g., rotatable members 118 driven by a motor 120. The rotatable members 118 extend horizontally across the forward portion 101 of the robot 100, e.g., along 75% to 95% of the width W1 of the robot 100. Referring also to FIG. 2, the cleaning inlet 117 is positioned between the rotatable members 118. The rotatable members 118 are rollers that counter rotate relative to one another. For example, the rotatable members 118 can be rotatable about parallel horizontal axes to agitate debris 106 on the floor surface 10 and direct the debris 106 toward the cleaning inlet 117, into the cleaning inlet 117, and into a suction pathway 145 (shown in FIG. 2) in the robot 100. Referring back to FIG. 3A, the rotatable members 118 can be positioned entirely within the forward portion 101 of the robot 100. The rotatable members 118 include elastomeric shells that contact debris 106 on the floor surface 10 to direct debris 106 through the cleaning inlet 117 between the rotatable members 118 and into an interior of the robot 100, e.g., into a debris bin 124 (shown in FIG. 2), as the rotatable members 118 rotate relative to the housing infrastructure 103. The rotatable members 118 further contact the floor surface 10 to agitate debris 106 on the floor surface 10. In some implementations, the rotatable members 118 include bristles to sweep the debris 106 into the suction pathway 145, while in other implementations, the rotatable members 118 are formed of an elastomeric material and have elastomeric vanes that engage the debris 106 to move the debris into the suction pathway 145.

The robot 100 further includes a vacuum system 119 operable to generate an airflow through the cleaning inlet 117 between the rotatable members 118 and into the debris bin 124. The vacuum system 119 can include an impeller and a motor to rotate the impeller to generate the airflow. The vacuum system 119 cooperates with the cleaning system 116 to draw debris 106 from the floor surface 10 into the debris bin 124. In some cases, the airflow generated by the vacuum system 119 creates sufficient force to draw debris 106 on the floor surface 10 upward through the gap between the rotatable members 118 into the debris bin 124. In some cases, the rotatable members 118 contact the floor surface 10 to agitate the debris 106 on the floor surface 10, thereby allowing the debris 106 to be more easily ingested by the airflow generated by the vacuum system 119.

The robot 100 further includes a brush 126 that rotates about a non-horizontal axis. The robot 100 includes a motor 128 operably connected to the brush 126 to rotate the brush 126. The brush 126 is a side brush laterally offset from a fore-aft axis FA of the robot 100 such that the brush 126 extends beyond an outer perimeter of the housing infrastructure 103 of the robot 100 and can thereby be capable of engaging debris on portions of the floor surface 10 that the rotatable members 118 typically cannot reach, e.g., portions of the floor surface 10 outside of a portion of the floor surface 10 directly underneath the robot 100. The brush 126 can clean along an edge in the space 20 as the robot 100 moves during an edge following mode (as discussed in this disclosure).

The electrical circuitry includes, in addition to the controller 109, a memory storage element 144 and a sensor system with one or more electrical sensors, for example. The sensor system, as described herein, can generate a signal indicative of a current location of the robot 100, and can generate signals indicative of locations of the robot 100 as the robot 100 travels along the floor surface 10. The controller 109 is configured to execute instructions to perform one or more operations as described herein. The memory storage element 144 is accessible by the controller 109 and disposed within the housing infrastructure 103.

The one or more electrical sensors are configured to detect features in the space 20, such as objects, obstacles, features of the floor surface 10, features on walls in the space 20. Detection of these features can be used as input for the controller 109 to control navigation of the robot 100 about the floor surface 10 and, as discussed in this disclosure, can be used to generate maps for the robot 100 to efficiently navigate about the space 20. Sensors of the robot 100 can be used to generate data for a global map, local maps, or both.

Referring to FIG. 3A, the sensor system can include cliff sensors 134 disposed along the bottom portion 113 of the housing infrastructure 103. Each of the cliff sensors 134 is an optical sensor that can detect the presence or the absence of an object below the optical sensor, such as the floor surface 10. The cliff sensors 134 can thus detect obstacles such as drop-offs and cliffs below portions of the robot 100 where the cliff sensors 134 are disposed and redirect the robot accordingly.

Referring to FIG. 3B, the sensor system can include one or more ranging sensors that can detect positions of objects along the floor surface 10 that are near the robot 100. In the implementations represented in FIG. 3B, the one or more ranging sensors of the robot 100 includes the ranging sensor 105 (shown in FIGS. 1A and 3B) directed toward a portion of the floor surface 10 forward of the robot 100. The ranging sensor 105 is an obstacle detection sensor. The ranging sensor 105 is configured to measure positions of obstacles forward of the robot 100. Such obstacles could be positioned on or above the floor surface 10. For example, a detection area detectable by the ranging sensor 105 can have a width at least as large as the width W1 (shown in FIG. 3A) of the robot 100. The ranging sensor 105, for example, can detect objects along a width at least as large as the region that corresponds to the local map 152 generated by the robot 100 using the sensors of the sensor system of the robot 100.

In some implementations, the ranging sensor 105 is a structured light sensor. In other implementations, the one or more ranging sensors can include non-contact time of flight sensors, such as lasers, volumetric point cloud sensors, optical point sensors, optical line sensors, IR proximity sensors, LIDAR, and acoustic sensors. In implementations in which the ranging sensor 105 is a structured light sensor, the ranging sensor 105 includes one or more light sources and one or more light detectors to detect reflections from light emitted by the light sources. The one or more light sources emit structured light that is projected along a point, an area, or along a line. In some implementations, the light projected by the light source on the path before the robot may include focused points of light or lines of light arrayed horizontally, vertically, or both. Based on at least the location of the reflected light, the controller 109 can use triangulation, for example, to determine the position and/or height of the reflection and distinguish between the floor surface 10 and an obstacle in the path of the robot 100.

The ranging sensor 105 is mounted on the forward portion 101 of the robot 100, e.g., along a front surface 111 of the robot 100. The ranging sensor 105 can be mounted in or behind the bumper 108 and can be protected by a transparent window. In some implementations, the ranging sensor 105 includes a first light emitter 105a and a second light emitter 105b. The first light emitter 105a can project light along a first line in the space 20, and the second light emitter 105b can project light along a second line in the space 20. For example, the first light emitter 105a can be angled downward to project light onto the floor surface 10, and the second light emitter 105b can be angled upward to project light above the floor surface 10. The first light emitter 105a can be configured to project its light beam at a downward oblique angle (relative to horizontal) to intersect the floor surface 10, and the second light emitter 105b can be configured to project its structured light at an upward oblique angle (relative to horizontal) to intersect objects above the floor surface 10. The ranging sensor 105 can include a light detector 105c to detect reflections of the light projected by the first light emitter 105a and the light projected by the second light emitter 105b. Based on at least the detected reflections, the controller 109 can generate a local map for the robot 100 and identify obstacles in the local map, e.g., a local map 152 shown in FIG. 4.

The sensor system includes a bumper system including the bumper 108 and one or more bump sensors that detect contact between the bumper 108 and obstacles in the space. The bumper 108 forms part of the housing infrastructure 103. For example, the bumper 108 can form the side surfaces and the forward surface of the forward portion 101 of the robot 100. The sensor system, for example, can include the bump sensors 139a, 139b. The bump sensors 139a, 139b can include break beam sensors, capacitive sensors, or other sensors that can detect contact between the robot 100, e.g., the bumper 108, and objects in the space. In some implementations, the bump sensor 139a can be used to detect movement of the bumper 108 along the fore-aft axis FA (shown in FIG. 3A) of the robot 100, and the bump sensor 139b can be used to detect movement of the bumper 108 along the lateral axis LA (shown in FIG. 3A) of the robot 100. In some implementations, the robot 100 can include proximity sensors that can detect objects before the robot 100 contacts the objects, and the bump sensors 139a, 139b can detect objects that contact the bumper 108, e.g., in response to the robot 100 contacting the objects.

The sensor system further includes an image capture device 140, e.g., a camera, directed toward a top portion 142 of the housing infrastructure 103. The image capture device 140 generates digital imagery of the space of the robot 100 as the robot 100 moves about the floor surface 10. The image capture device 140 is angled in an upward direction, e.g., angled between 30 degrees and 80 degrees from the floor surface 10 about which the robot 100 navigates. The camera, when angled upward, is able to capture images of wall surfaces of the space so that features corresponding to objects on the wall surfaces can be used for localization.

The sensor system can further include sensors for tracking a distance traveled by the robot 100. For example, the sensor system can include encoders associated with the motors 123, 125 for the drive wheels 112, 114, and these encoders can track a distance that the robot 100 has traveled. In some implementations, the sensor system includes an optical sensor facing downward toward a floor surface. The optical sensor can be an optical mouse sensor. For example, the optical sensor can be positioned to direct light through a bottom surface of the robot 100 toward the floor surface 10. The optical sensor can detect reflections of the light and can detect a distance traveled by the robot 100 based on at least changes in floor features as the robot 100 travels along the floor surface 10.

The sensor system can further include a debris detection sensor 147 for detecting debris on the floor surface 10. The debris detection sensor 147 can be used to detect portions of the floor surface 10 in the space that are dirtier than other portions of the floor surface 10 in the space. In some implementations, the debris detection sensor 147 (shown in FIG. 2) is capable of detecting an amount of debris, or a rate of debris, passing through the suction pathway 145. The debris detection sensor 147 can be used to detect debris already ingested into the robot 100 or to detect debris on the floor surface 10 without the robot 100 having to ingest the debris for the debris detection sensor 147 to detect the debris. The debris detection sensor 147 can detect information representing a type of the debris, e.g., a size, a texture, whether the debris can be ingested into the robot 100, or other information about the debris that can be used to categorize the debris.

The debris detection sensor 147 can be an optical sensor configured to detect debris as it passes through the suction pathway 145. Alternatively, the debris detection sensor 147 can be a piezoelectric sensor that detects debris as the debris impacts a wall of the suction pathway 145. In some implementations, the debris detection sensor 147 detects debris before the debris is ingested by the robot 100 into the suction pathway 145. The debris detection sensor 147 can be, for example, an image capture device that captures images of a portion of the floor surface 10 ahead of the robot 100. The image capture device can be positioned on a forward portion of the robot 100 can be directed in such a manner to detect debris on the portion of the floor surface 10 ahead of the robot 100. The controller 109 can then use these images to detect the presence of debris on this portion of the floor surface 10.

An edge following sensor 148 of the robot 100 can be used to detect an obstacle on a lateral side 149a of the robot 100, e.g., a right side of the robot 100. The edge following sensor 148, in this regard, is also an obstacle detection sensor. The edge following sensor 148 can be, for example, an optical sensor, an ultrasonic sensor, or another ranging sensor that is used to detect the obstacle. The edge following sensor 148 can generate signals indicative of a distance of the detected obstacle from the robot 100. These signals can be used by the controller 109 to navigate the robot 100 in an edge following mode in which the robot 100 is controlled to follow an edge of the obstacle on the floor surface 10 while maintaining a distance between the robot 100 and the obstacle, e.g., between the lateral side 149a of the robot 100 on which the edge following sensor 148 is positioned and the edge of the obstacle. In further implementations, the robot 100 can include another edge following sensor 148 along a lateral side 149b of the robot 100, e.g., a left side of the robot 100.

In further implementations, the robot 100 can include other obstacle detection sensors positioned around a periphery of the robot 100. For example, in addition to the ranging sensor 105, the robot 100 can include one or more proximity sensors on a front portion of the robot 100. The proximity sensors can also be used to detect obstacles forward of the robot 100.

The controller 109 uses data collected by the sensors of the sensor system to control navigational behaviors of the robot 100 during the mission. For example, the controller 109 uses the sensor data collected by sensors of the robot 100 to enable the robot 100 to avoid obstacles within the space of the robot 100 during the mission, and to generate and update a global map and a local map.

Figure 4:
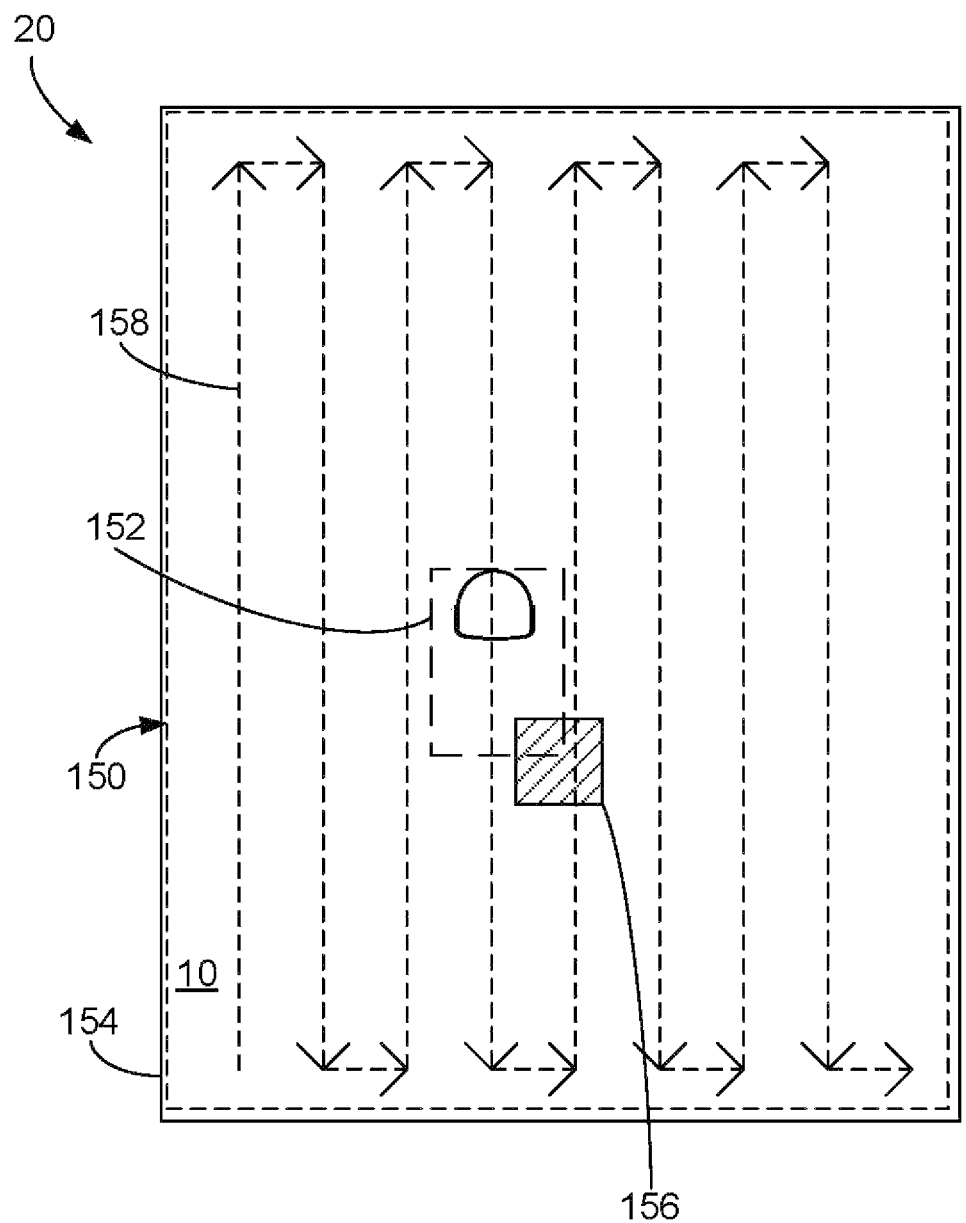
FIG. 4 is a top view of an autonomous cleaning robot with a representation of a local map and a representation of a global map.

The sensor data can be used by the controller 109 for simultaneous localization and mapping (SLAM) techniques in which the controller 109 extracts features of the space represented by the sensor data and constructs maps of the floor surface 10 of the space. The sensor system can be used to generate one or more maps of the space 20 that can be used by the robot 100. For example, as shown in FIG. 4, the sensor system can be used to generate a global map 150 that the robot 100 can use for planning paths for navigating the robot 100 about the space 20. The global map 150 can be a persistent map usable from mission to mission. The sensor system can also be used to generate local maps, e.g., a local map 152, for the robot 100 of a region around a current location of the robot 100 as the robot 100 travels about the space 20. The local maps can be used to generate and update the global map 150.

The sensor data collected by the image capture device 140 can be used for techniques such as vision-based SLAM (VSLAM) in which the controller 109 extracts visual features corresponding to objects in the space and constructs the maps (e.g., the global map in some implementations) using these visual features. As the controller 109 directs the robot 100 about the floor surface 10 during the mission, the controller 109 uses SLAM techniques to determine a location of the robot 100 within the global map by detecting features represented in collected sensor data and comparing the features to previously stored features. The map formed from the sensor data can indicate locations of traversable and nontraversable space within the space. For example, locations of obstacles are indicated on the map as nontraversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the robot 100 to perform its behaviors, the memory storage element 144 stores sensor data or data resulting from processing of the sensor data for access by the controller 109 from one mission to another mission. For example, the map is a persistent map that is usable and updateable by the controller 109 of the robot 100 from one mission to another mission to navigate the robot 100 about the floor surface 10.

The persistent data, including the global map, enable the robot 100 to efficiently clean the floor surface 10. For example, the persistent map enables the controller 109 to direct the robot 100 toward open floor space and to avoid nontraversable space. In addition, for subsequent missions, the controller 109 is able to plan navigation of the robot 100 through the space using the persistent map to optimize paths taken during the missions.

The global map 150 can provide a layout of traversable areas within the space 20, and can identify fixed objects, e.g., walls, fixtures, furniture, and other objects tend to remain in place within the space 20, in the space 20 that make certain portions of the space 20 nontraversable for the robot 100.

The global map 150 can be constructed based on at least data generated by sensors of the sensor system described in this disclosure. The data used to generate the local map 152 can be used to generate the global map 150. For example, as local maps are generated, the data generated for the local maps can be used to update the global map 150. If the robot 100 identifies an object in the space 20 that should be populated in the global map 150 (e.g., a fixed object that will not appear to move), the global map 150 can be updated to identify the location of the object as nontraversable. Similarly, if the robot 100 identifies that a region represented in the global map 150 as nontraversable is traversable, the robot 100 can update the global map 150 to indicate that the region is traversable. In this regard, the global map 150 can represent at least some of the data that are represented in local maps generated by the robot 100. In some implementations, the global map 150 can also be constructed based on at least other data received by the robot 100, e.g., a user-uploaded map or a map from a server.

The robot 100 can use odometry data generated by the sensor system to determine a location of the robot 100 on the global map 150. Odometry is the use of data from the movement of actuators to estimate change in position over time (distance traveled). In some implementations, an encoder is disposed on the drive system 110 for measuring wheel revolutions, and thus a distance traveled by the robot 100. The controller 109 may use odometry in assessing a confidence level for locations of objects in the space 20. The controller 109 can use a dead reckoning process to estimate a current position based upon a previously determined position. Alternatively or additionally, the controller 109 may receive image data from an imaging sensor for computing motion of the robot 100 through visual odometry.

In the example shown in FIG. 4, walls 154 are identified in the global map 150, and an obstacle 156 is not identified in the global map 150. The obstacle 156, for example, can be an object in the space 20 that occupants of the space 20 have recently placed in the space 20, e.g., a new piece of furniture, or an object that the occupants move in the space 20, e.g., clothing, a toy, a box, or other movable object. The global map 150 can be used by the robot 100 to generate planned paths 158 for navigating about the space 20. In the implementations represented in FIG. 4, the robot 100 performs a coverage routine to cover the traversable area within the space 20. Since the obstacle 156 is absent from the global map 150, the planned paths 158 include trajectories that move through a portion of the floor surface 10 that is now nontraversable because of the presence of the obstacle 156.

Local maps generated by the sensor system of the robot 100 can be used for avoiding obstacles in a vicinity of the robot 100. The local maps can advantageously be used for navigating the robot 100 about obstacles that may not be identified on the global map 150, e.g., the obstacle 156. The local maps can identify objects in the space 20 in a region around the robot 100. For example, the local map 152 can identify a location of the obstacle 156 (e.g., detected using the ranging sensor 105 as described in this disclosure). The local map 152 is smaller than the global map 150 but has a higher resolution than the global map 150. For example, the local map 152 can have a resolution of 0.5 to 5 centimeters, e.g., 0.5 to 2.5 centimeters, 1 to 3 centimeters, 2 to 4 centimeters, 3 to 5 centimeters, about 2 centimeters, about 3 centimeters, about 4 centimeters, etc., and the global map 150 can have a resolution of about 5 to 15 centimeters, e.g., 5 to 10 centimeters, 7.5 to 12.5 centimeters, 10 to 15 centimeters, about 7.5 centimeters, about 10 centimeters, about 12.5 centimeters, or more. The resolution of the local map 152 can be 5% to 20% of the width W1 of the robot 100, and the resolution of the global map 150 can be about 20% to 100% of the width W1 of the robot 100. The lower resolution of the global map 150 compared to the local map 152 can reduce the amount of memory needed for storing the global map 150, and the higher resolution of the local map 152 can allow the robot 100 to more easily respond to objects in the space 20 that are in the immediate vicinity of the robot 100.

The local map 152 can identify the location of the obstacle 156 based on at least data generated by the sensor system of the robot 100. For example, the sensor system of the robot 100 can detect objects in a region around a current location of the robot 100, and the data generated by the sensor system is used to generate the local map 152. In the example shown in FIG. 4, the robot 100, e.g., using the ranging sensor 105 of the robot 100, detects the obstacle 156, and the local map 152 generated by the sensor system of the robot 100 identifies the obstacle 156 on the local map 152.

The regions corresponding to the local maps can overlap, and thus a particular local map can use data collected at multiple locations of the robot 100. The local map 152 can be continually updated as the robot 100 moves about the space 20. In particular, the region covered by the local map 152 varies as the robot 100 moves about the space 20. The local map 152, furthermore, can be generated based on at least data collected by the sensor system of the robot 100 at a current location of the robot 100. In some implementations, the local map 152 can be generated based on at least the data collected at the current location as well as data collected at previous locations of the robot 100. In other words, the robot 100 can update the local map as the robot 100 travels about the space 20 and as the region corresponding to the local map changes with movement of the robot 100.

The controller 109 can use the global and local maps to operate the robot 100 to navigate about the space 20 in a mission. When the controller 109 causes the robot 100 to perform the mission, the controller 109 operates the motors 123, 125 to drive the drive wheels 112, 114 and propel the robot 100 along the floor surface 10. In addition, the controller 109 operates the motor 120 to cause the rotatable members 118 to rotate, operates the motor 128 to cause the brush 126 to rotate, and operates the motor of the vacuum system 119 to generate the airflow. To cause the robot 100 to perform various navigational and cleaning behaviors, the controller 109 executes software stored on the memory storage element 144 to cause the robot 100 to perform by operating the various motors of the robot 100. The controller 109 operates the various motors of the robot 100 to cause the robot 100 to perform the behaviors.

In implementations, the controller 109 can operate the robot 100 to move along planned paths between waypoints on the floor surface 10. For example, the controller 109 can operate the robot 100 in various modes, generating waypoints consistent with these modes. In a coverage mode, the controller 109 can generate one or more waypoints along the floor surface 10 that cause the robot 100 to cover an interior portion of a room in a space. The coverage mode allows the robot 100 to clean traversable portions of the room. In an edge following mode (discussed with respect to FIG. 12), the controller 109 can operate the robot 100 to cover edges defining the interior portion of the room. The edge following mode allows the robot 100 to clean along the edges of the room, where debris can accumulate more easily, while maintaining an edge following distance from the edges of the room, e.g., a distance less than 1 centimeter, less than 0.5 centimeters, etc., using the edge following sensor 148 (shown in FIG. 3B) of the robot 100. In a travel mode, the controller 109 can generate one or more waypoints to move the robot 100 from a first area to a second area. The first area can correspond to a first room, and the second area can correspond to a second room. For larger rooms, the first area can correspond to a first region within a room, and the second area can correspond to a second region within the room. Other modes are possible.

As discussed in this disclosure, the controller 109 can include a gentle mode that allows the robot 100 to be navigated about the space 20 while avoiding contact with obstacles in the space 20. The gentle mode can include an obstacle avoidance mode that causes the robot 100 to navigate about an obstacle. The obstacle avoidance mode can override a mode that causes the robot 100 to move along a planned path. The obstacle avoidance mode can be initiated to cause the robot 100 to be navigated about an obstacle along the planned path. The controller 109, in some implementations, generates the planned path independent of the obstacle, and thus the planned path does not consider the presence of the obstacle. The gentle mode can further include an edge following mode that avoids contact with obstacles in the space 20, and include one or more behaviors for performing specific navigational maneuvers, such as a rotation in place. Implementations of the gentle mode are described in this disclosure.

In operating in these different modes, the robot 100 can be controlled to move along trajectories. Each trajectory can correspond to one or more parameters for the drive system of the robot 100. For example, a particular trajectory of the robot 100 can be defined by a velocity setting and/or an acceleration setting for the drive wheel 112 and a velocity setting and/or an acceleration setting for the drive wheel 114. A path, e.g., a planned path, followed by the robot 100 can involve the robot 100 being moved along one or more trajectories.

Examples of Processes

Further implementations of processes involving gentle modes are discussed with respect to FIGS. 6-13. In particular, processes involving an obstacle avoidance mode that can be initiated as part of a gentle mode are described with respect to FIGS. 6-10F. Processes for rotating a robot in place as part of a gentle mode are described with respect to FIGS. 11A-11G. And processes involving an edge following mode that can be initiated as part of an edge following mode are described with respect to FIGS. 12-13. Other modes of the robot can be initiated during a gentle mode, or can include instances in which the gentle mode is initiated.

Figure 5:
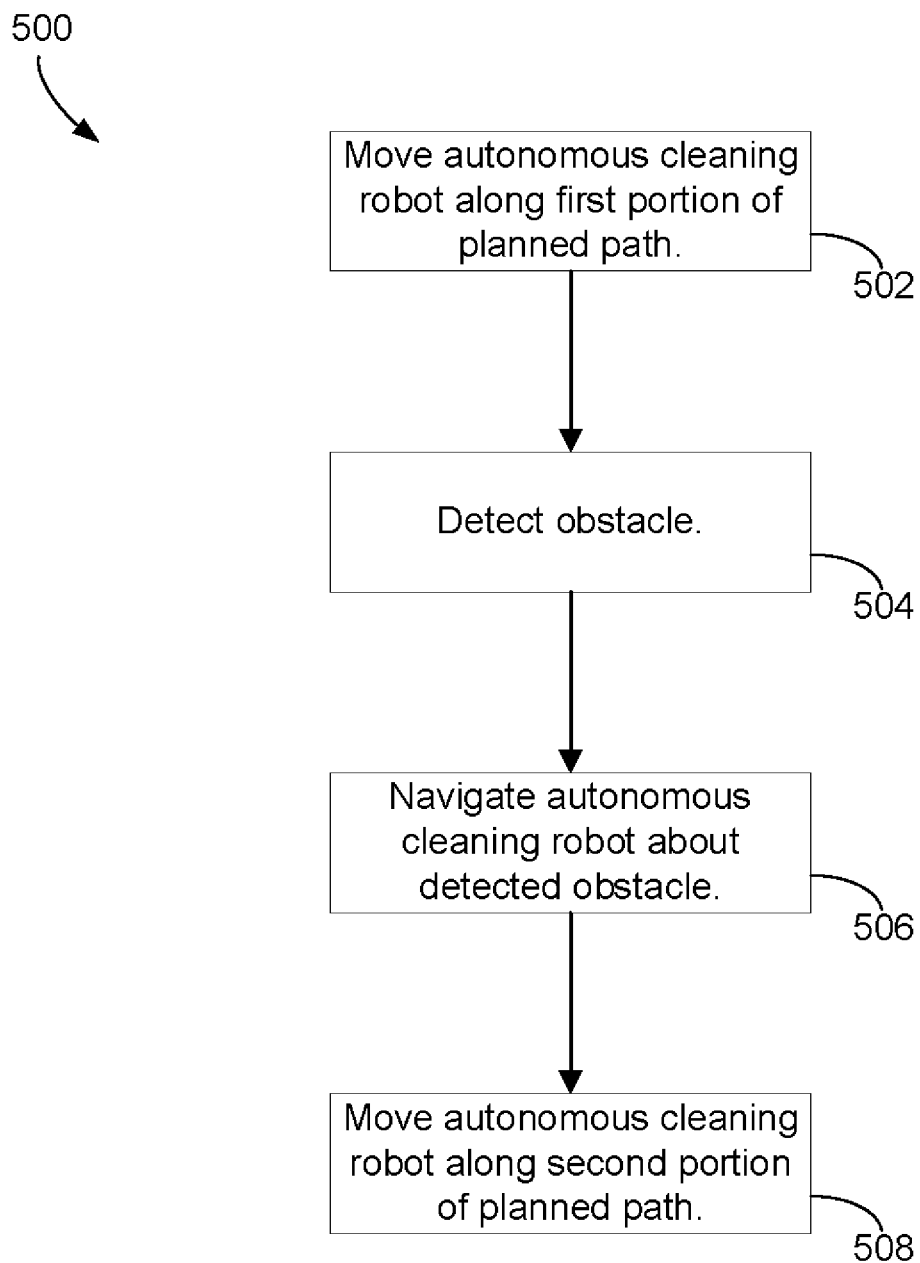
FIG. 5 is a flowchart of a process for controlling an autonomous cleaning robot to avoid an obstacle.

FIG. 5 illustrates a process 500 for avoiding an obstacle. In the process 500, the robot 100 is controlled to avoid an obstacle encountered by the robot 100, for example, in an obstacle avoidance mode or a gentle mode. This obstacle avoidance mode can be distinct from another obstacle avoidance mode of the robot 100 in which the robot 100 uses the bumper of the robot 100 to detect and move around obstacles. This obstacle avoidance mode can be part of a gentle mode in which the robot 100 uses the local map to prospectively detect obstacles before contacting the obstacles, and then select trajectories to avoid contacting obstacles with the bumper or outer surface of the robot 100. The process 500 can be performed by the controller 109 of the robot 100. In some implementations, at least some operations of the process 500 can be performed by one or more processors distinct from the controller 109 of the robot 100, e.g., located other devices in communication with the robot 100.

At an operation 502 of the process 500, the robot 100 is controlled to move along a first portion of a path. The path, for example, corresponds to a planned path to a waypoint from a current location of the robot 100. As discussed in this disclosure, the planned path can correspond to a path that the robot 100 follows in another mode of the robot 100, such as a coverage mode, an edge following mode, a travel mode, or another appropriate mode of the robot 100. In this other mode, one or more waypoints are generated, and the robot 100 is controlled to move along a path to a waypoint. At the operation 502, the robot 100 is moved along only a portion of the path. To proceed along a portion of the path, one or more trajectories can be generated, and the robot 100 can be moved along the one or more trajectories to follow the path.

An operation 504 of the process 500 is an obstacle detection operation. In the obstacle detection operation, for example, the robot 100 determines whether an obstacle is present along a portion of the path in front of the robot 100. The robot 100 can detect the obstacle based on the local map generated using sensor data generated by the sensor system of the robot 100. For example, the robot 100 can detect the obstacle using sensor data generated by the sensor system. At the operation 504, an area footprint of the robot 100 can be used to determine whether the robot 100 would collide with an obstacle if the robot 100 proceeded along a current trajectory. In particular, the local map of the robot 100 in which a location of an obstacle is indicated is used in combination with a current trajectory of the robot 100 and the area footprint of the robot 100 to determine whether collision would occur. If the area footprint of the robot 100, if the robot 100 were to continue along the current trajectory, were to intersect with an obstacle stored on the local map of the robot 100, then at the operation 504, the obstacle is detected.

If an obstacle is detected at the operation 504, at an operation 506, the robot 100 is controlled to navigate about the obstacle. The robot 100 can, for example, initiate an obstacle avoidance mode in which one or more commands are issued to cause the robot 100 to move around the obstacle without contacting the obstacle. In some implementations, commands can be repeatedly issued to the robot 100 to cause the robot 100 to move along a series of trajectories that move the robot 100 from the first portion of the path along which the robot 100 moves at the operation 502, move the robot 100 away from the path and around the obstacle to avoid the obstacle, and move the robot 100 back toward the path so that the robot 100 can move along a remainder of the path (e.g., at an operation 508). The series of trajectories, as described with respect to implementations represented in FIG. 6, are selected such that the robot 100 does not collide with the obstacle and maintains a threshold distance from the obstacle.

After the robot 100 moves around the obstacle and returns to the planned path, at the operation 508, the robot 100 is controlled to move along a second portion of the path. For example, the controller 109 can move the robot 100 along the second portion of the path to the waypoint that at least partially defines the path. In some implementations, one or more additional obstacles may be present along the path. In this regard, the operations 504 and 506 can be repeated to cause the robot 100 to avoid these obstacles.

The process 500 can vary in implementations. A process 600 shown in FIG. 6 represents some implementations of the process 500. FIGS. 7A-7F illustrate an example of the robot 100 during the process 600. FIGS. 7A-7F show the robot 100 encountering an obstacle 700 as the robot 100 is moved along the path 702 and avoiding the obstacle 700 in an obstacle avoidance mode.

Figure 6:
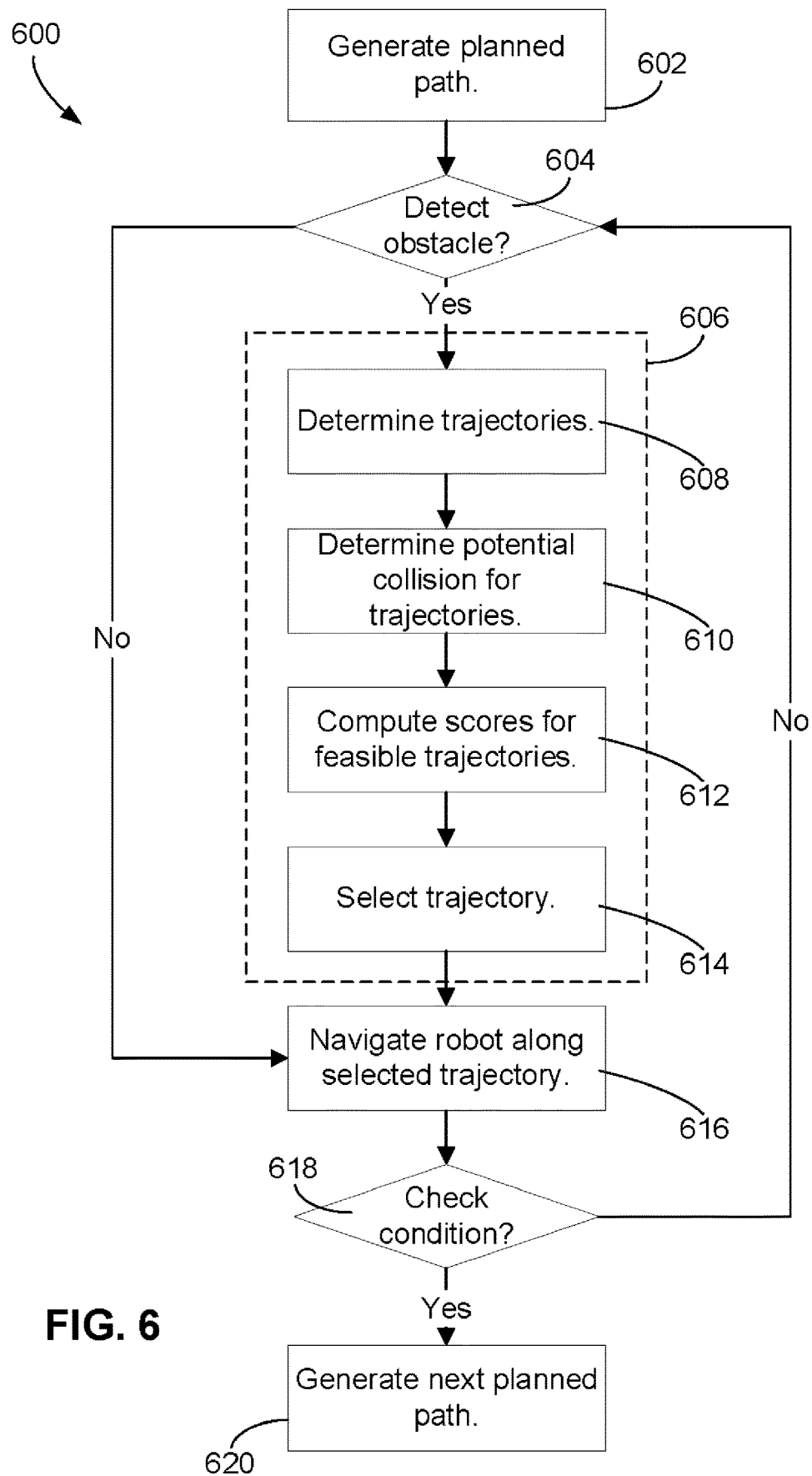
FIG. 6 is a flowchart of another process for controlling an autonomous cleaning robot to avoid an obstacle.

Referring to FIG. 6, at an operation 602, a planned path for the robot 100 is generated. The planned path can correspond to a path that is followed by the robot 100 in a coverage mode, a travel mode, or another appropriate mode described in this disclosure.

At an operation 604, an obstacle can be detected. In particular, the obstacle detected blocks at least a trajectory of the robot 100. For example, at the operation 604, the robot 100 detects the obstacle if the controller 109 determines that the robot 100 would collide with the obstacle if the robot 100 were controlled to follow a trajectory corresponding to the most recent command issued to the robot 100. The operation 604 can be similar to the operation 504, and the obstacle can be detected in ways similar to those described with respect to the operation 504. If the obstacle is not detected, then an operation 616, the robot 100 is navigated to move along a selected trajectory that corresponds to a trajectory for moving the robot 100 along the planned path generated at the operation 602. If the obstacle is detected, then the operation 606 is performed and an obstacle avoidance mode is initiated.

In some implementations, at the operation 604, the process 600 proceeds to the operation 606 even if the robot 100 does not detect an obstacle using its sensor system while the robot 100 is at its current location. For example, the process 600 can proceed to the operation 606 in the event that no obstacle is detected because an obstacle was recently detected by the robot 100. This can allow the robot 100 to perform obstacle avoidance trajectories for a sufficient number of iterations to clear the obstacle and return to the planned path. For example, at the operation 604, a threshold time period can be used to determine whether to proceed to the operation 606. During a threshold time period after an obstacle is detected, the process 600 proceeds to the operation 606. The threshold time period can be between 1 and 10 seconds, e.g., between 2 and 8 seconds, 3 and 7 seconds, 4 and 6 seconds, etc. If the robot 100 is positioned along the planned path during the threshold time period, as discussed below, the highest scoring trajectory that is selected for the robot 100 in the operation 606 can correspond to a trajectory that moves the robot 100 along the planned path at a default speed of the robot 100, e.g., a speed of the robot 100 in a coverage mode or another mode apart from the obstacle avoidance mode.

Figure 7A:
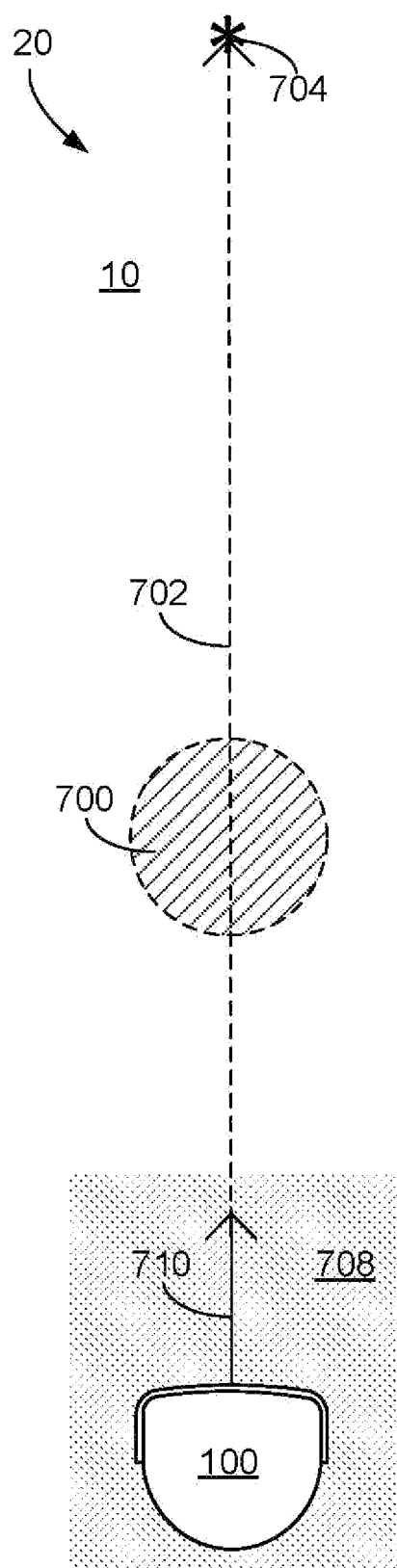

Referring also to FIG. 7A, for example, the robot 100 is moved along a path 702 that terminates at a waypoint 704. As shown in FIG. 7A, an obstacle 700 is present along the path 702. In particular, the obstacle 700 blocks at least part of the path 702. A local map 708 of the robot 100 corresponds to an area of the floor surface 10 where the sensor system detects obstacles that cannot be traversed by the robot 100. The local map 708 can be generated using sensor data in the ways described in this disclosure. In the example shown in FIG. 7A, the robot 100, using the local map 708, does not detect the obstacle 700 and thus advances along the path 702 along a trajectory 710 that maintains the position of the robot 100 along the path 702.

Figure 7B:
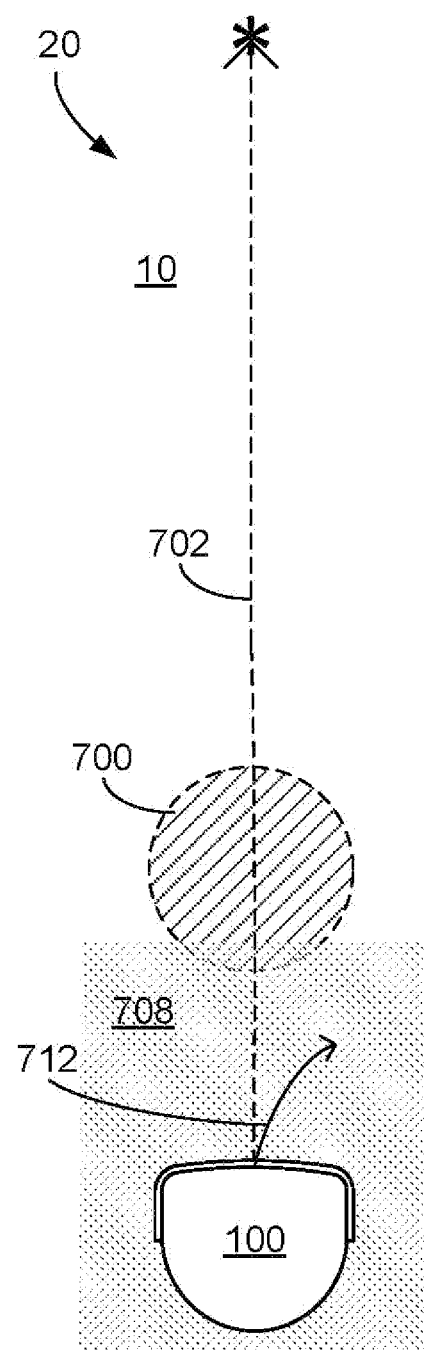

Referring to FIG. 7B, as the robot 100 advances along the path 702, the robot 100 moves closer to the obstacle 700 until the robot 100 is sufficiently close to detect the obstacle 700. The obstacle 700 is detected by the sensor system of the robot 100. In particular, at least part of the obstacle 700 is detected in the local map 708.

If an obstacle is detected, as shown in FIG. 7B, an operation 606 is performed to initiate an obstacle avoidance mode. As discussed in this disclosure, the obstacle avoidance mode can be an override behavior that overrides the planned path 702 for the robot 100. The operation 606 can include one or more sub-operations, e.g., operations 608, 610, 612, 614.

At the operation 608, potential trajectories along the floor surface 10 for the robot 100 are determined. These potential trajectories correspond to potential commands for the robot 100 to move the robot 100 along the floor surface 10, and potential commands that can be selected to navigate the robot 100 around the obstacle detected at the operation 604. The potential trajectories can be determined in a number of ways. In some implementations, the potential trajectories can include a first set of trajectories corresponding to template trajectories, a second set of trajectories corresponding to exploration trajectories, and a third set of trajectories corresponding to adjustment trajectories.

Figure 8A:
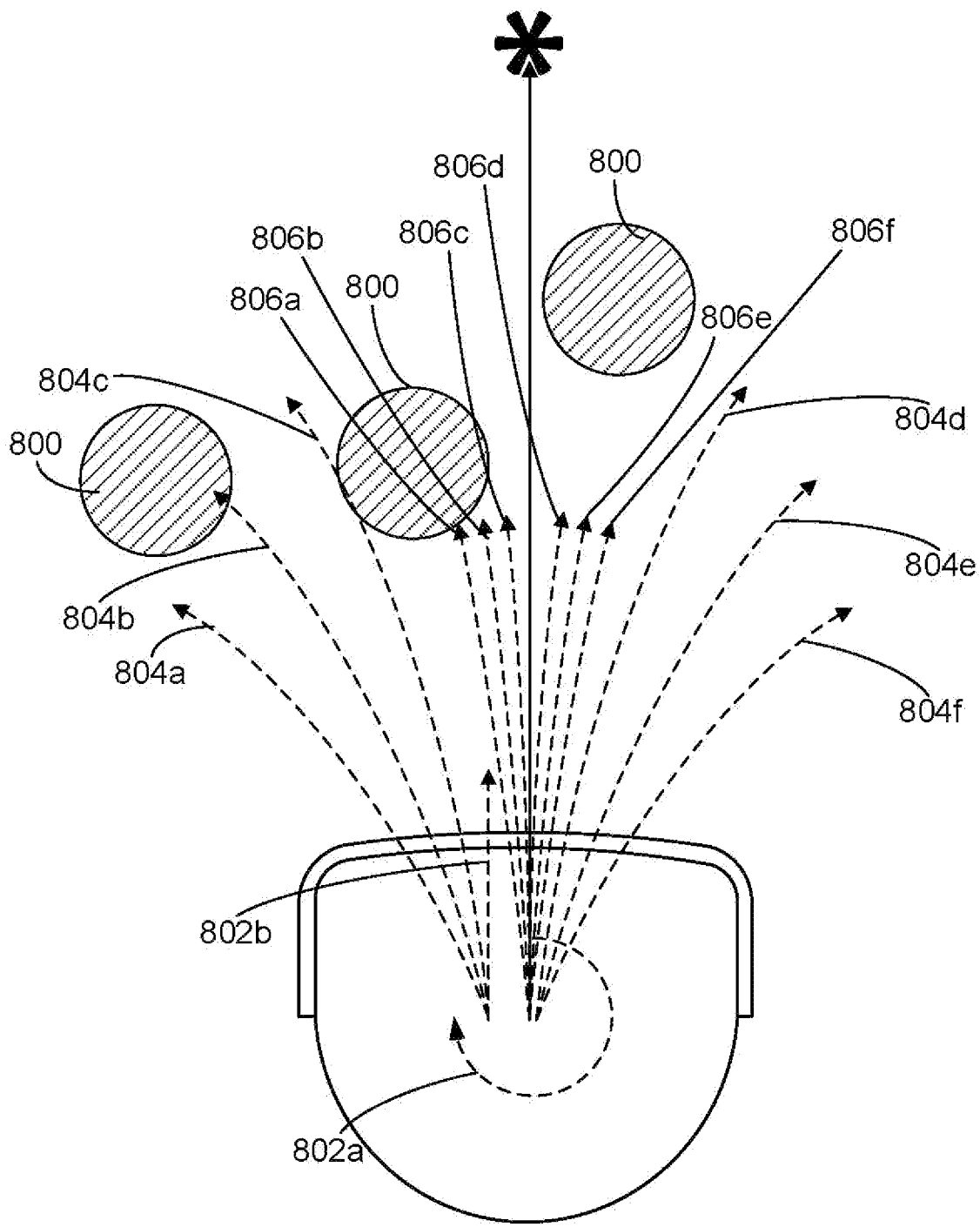
FIGS. 8A-8B are top views of an autonomous cleaning robot and alternative trajectories for the robot.

The template trajectories can include trajectories that are part of the set of potential trajectories whenever the obstacle avoidance mode is initiated and the operation 606 is performed. For example, FIG. 8A illustrates a set of potential trajectories for the robot 100. Obstacles 800 are indicated in the local map of the robot 100. In this regard, the controller 109 of the robot 100 can trace movement of the robot 100 along the potential trajectories to determine whether the robot 100 would collide with any of the obstacles 800 by following the potential trajectories. Template trajectories of the potential trajectories can include trajectories 802a, 802b (collectively referred to as template trajectories 802). The trajectory 802a corresponds to a trajectory to rotate the robot 100 in place, and the trajectory 802b corresponds to a trajectory to reduce a speed of the robot 100 relative to a current speed of the robot 100. The template trajectories 802 can include other trajectories in other implementations, such as a trajectory to move the robot 100 in a rearward direction, a trajectory to rotate the robot 100 in place in a first direction, a trajectory to rotate the robot 100 in place in a second direction, a trajectory to move to increase a speed of the robot 100, a trajectory to move the robot 100 along a fixed arc, or other trajectories.

Exploration trajectories are trajectories determined by varying a parameter of the drive system 110 (shown in FIG. 3A) of the robot 100 within maximum and minimum values for the parameter. The maximum and minimum values can be defined by the mechanical limitations of the drive system 110 of the robot 100, e.g., a motor of the robot 100. Multiple parameters can be varied to obtain the exploration trajectories. For example, in implementations in which the drive system 110 of the robot 100 has drive wheels 112, 114 (shown in FIG. 3A), the exploration trajectories are obtained by varying the drive wheel 112 between a minimum speed value for the drive wheel 112 and a maximum speed value for the drive wheel 112 and by varying the drive wheel 114 between a minimum speed value for the drive wheel 114 and a maximum speed value for the drive wheel 114. The speed values can be varied at fixed intervals. For example, if the minimum speed value for both of the wheels 112, 114 is 0 meters per second, the maximum speed value for both of the wheels 112, 114 is 1 meters per second, and the fixed interval is 0.5 meter per second, the exploration trajectories can include any trajectory in which the wheel 112 is driven at a speed of 0, 0.5, and 1 meter per second and the wheel 114 is driven at a speed of 0, 0.5, and 1 meter per second. The fixed interval can vary in implementations. The fixed interval can be between 0.01 and 1 meter per second (e.g., between 0.01 and 0.5 meters per second, 0.1 and 0.5 meters per second, 0.1 and 0.3 meters per second, etc.). The minimum and maximum values can also vary in implementations and do not necessarily correspond to mechanical limitations of the drive system 110 of the robot 100. For example, the maximum value can be between 0.5 and 5 meters per second (e.g., between 0.5 and 3 meters per second, 1 and 4 meters per second, 1 and 3 meters per second, etc.). Referring to FIG. 8A, the exploration trajectories can include trajectories 804a, 804b, 804c, 804d, 804e, 804f (collectively referred to as exploration trajectories 804). The exploration trajectories 804 include trajectories to move the robot 100 leftward (e.g., the trajectories 804a, 804b, 804c) and rightward (e.g., the trajectories 804d, 804e, 804f). Other exploration trajectories are possible in implementations.

Figure 8B:
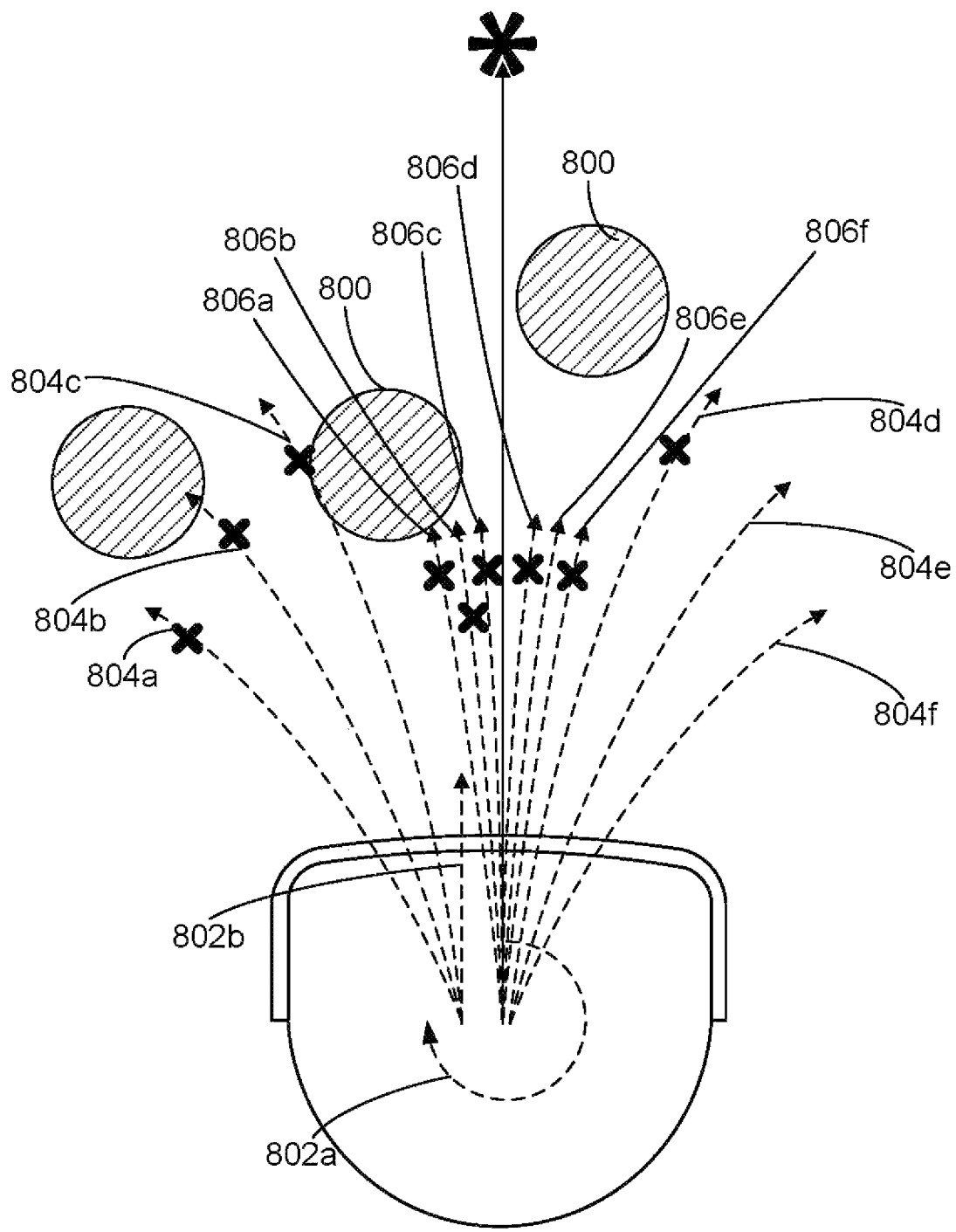

Adjustment trajectories can include trajectories corresponding to the previous command issued to the robot 100 with slight adjustments within a range. In particular, whereas the exploration trajectories correspond to trajectories for the robot 100 when parameters of the drive system 110 are varied over a range between minimum and maximum values (e.g., minimum and maximum speed of left and right drive wheels), the adjustment trajectories are varied over a smaller range that depends on the previous command issued to the robot 100. In particular, the range can be a limited range centered on the previous value for the parameter of the drive system 110. The limited range can be, for example, 5% to 25% of a total range (e.g., the range discussed with respect to the exploration trajectories). For example, if the previous command corresponds to a speed of 1 meter per second for the wheel 112 and a speed of 1 meter per second for the wheel 114, and the limited range is 5% of the total range, the adjustment trajectories can include any trajectory with speeds for the wheels between 0.9 and 1.1 meters per second. Fixed intervals can be used for the adjustment trajectories as well. The fixed intervals can be selected such that the potential trajectories include the same number of exploration trajectories and adjustment trajectories. Referring to FIG. 8B, the adjustment trajectories can include trajectories 806a, 806b, 806c, 806d, 806e, 806f (collectively referred to as adjustment trajectories 806). The adjustment trajectories 806 include trajectories to move the robot 100 leftward (e.g., the trajectories 806a, 806b, 806c) and rightward (e.g., the trajectories 806d, 806e, 8060. Other adjustment trajectories are possible in implementations.

In implementations, for the exploration trajectories and the adjustment trajectories, the parameter that is varied can be a motion parameter of the robot 100, e.g., a speed of the robot 100 or a heading of the robot 100. The drive system of the robot 100 can be controlled to vary the speed and the heading of the robot 100 within a range for the exploration trajectories or within another, more limited range for the adjustment trajectories.

Referring back to FIG. 6, at the operation 610, the trajectories are evaluated to determine whether they would cause a collision between the robot 100 and the obstacle detected at the operation 604. The controller 109 can determine whether a collision would occur for each trajectory. If a collision would occur for a particular trajectory, the controller 109 determines that the particular trajectory is not a feasible trajectory. To determine whether collision would occur for a particular trajectory, the controller 109 can, for example, trace a footprint of the robot 100 across the entirety of the particular trajectory. If the footprint of the robot 100 intersects with an obstacle, the particular trajectory is determined to not be a feasible trajectory. Referring also to FIG. 8B, for example, the trajectories 804a-804d and 806a-806f would cause the robot 100 to collide with at least one of the obstacles 800. In this regard, these trajectories are determined not to be feasible trajectories. The trajectories 802a-b and 804e-f would maintain at least a threshold distance from the obstacles 800 and would not cause the robot 100 to collide with the obstacles. These trajectories are feasible trajectories that are selectable to avoid the obstacles 800.

Referring back to FIG. 6, at the operation 612, scores are computed for the feasible trajectories. The feasible trajectories correspond to the trajectories determined at the operation 608 to not result in collision between the robot 100 and obstacles on the floor surface 10 or determined at the operation 610 to result in maintaining a threshold distance from any obstacles on the floor surface 10. In implementations, the scores can be computed based on different criteria.

For example, in some implementations, the criteria for scoring include a distance between a trajectory and the waypoint for the planned path. As the distance decreases, the score assigned to a particular trajectory is increased. In some implementations, the criteria for scoring include a distance between the trajectory and the planned path (e.g., a minimum distance between the trajectory and the planned path). As the distance decreases, the score assigned to a particular trajectory is increased. A heading of the robot 100 along the trajectory relative to the planned path, or a combination of any of these criteria. As a difference between a heading of the robot 100 and a direction of the planned path decreases, the score assigned to a particular trajectory increases. The criteria for scoring can include one of these criteria or any combination of these criteria.

At the operation 614, one of the trajectories is selected based on the score computed at the operation 612. For example, the trajectory with the highest score can be selected.

At the operation 616, the robot 100 is navigated along the trajectory selected at the operation 614. As discussed above, the trajectory can correspond to a trajectory that maintains the robot 100 along the planned path generated at the operation 602. Alternatively, if the obstacle is detected and alternative trajectories are generated and selected at the operation 606, the trajectory corresponds to the alternative trajectory selected at the sub-operation 614 of the operation 606. At the operation 616, a servo control process is implemented to achieve a desired velocity or desired velocities of the drive system of the robot 100 (e.g., velocities of motors associated with the drive wheels of the robot 100). The desired velocities correspond to the velocities that achieve the selected trajectory (e.g., the trajectory for advancing the robot 100 along the planned path generated at the operation 602 or the trajectory for avoiding the obstacle that is selected at the operation 614).

At an operation 618, a condition is checked to determine whether the robot 100 has reached an end of the planned path. If the condition is not satisfied, the process 600 proceeds to the operation 604. The operation 606 is performed if an obstacle is detected. And then the robot 100 is navigated along another selected trajectory at the operation 616. In implementations of the process 600, the controller 109 can initiate an initial iteration of the operation 616 and then repeatedly perform subsequent iterations of the operation 616 if the condition is not satisfied. In this regard, in implementations in which an obstacle is detected, the operation 606 for selecting a trajectory to avoid an obstacle can be repeated performed. For example, the operations 608, 610, and 612 can be repeatedly performed to determine trajectories and select a high-scoring trajectory of the trajectories. And then the operation 614 can be repeatedly performed to cause the robot 100 to be navigated along the high-scoring trajectory.

The condition can vary in implementations. In some implementations, the condition corresponds to a position of the robot 100 being on the planned path to the waypoint that the robot 100 was advancing along at the operation 602. If this condition is satisfied, then the robot 100 is able to be controlled to continue advancing along the planned path. In some implementations, the condition corresponds to a minimum distance between a position of the robot 100 and the planned path exceeding a threshold distance. Such a condition can be checked in order to determine whether the robot 100 has moved too far from the planned path. The minimum distance between the position of the robot 100 and the planned path can be an indicator of whether the obstacle that the robot 100 is avoiding at the operation 606 may be a large obstacle that cannot be avoided in a way that allows the robot 100 to return to the planned path. For example, the obstacle could be a piece of furniture added to the space 20 that blocks the robot 100 from reaching the waypoint. In some implementations in which the robot 100 cannot return to the original planned path, the obstacle can be added to the global map of the robot 100, and a new planned path can be generated based on the global map. In this regard, at the operation 602 for example, a new planned path can be generated and the controller 109 can navigate the robot 100 based on the new planned path that accounts for the obstacle.

In some implementations, the condition corresponds to an amount of time elapsed during iterations of the operation 606. For example, if multiple iterations are performed, the amount of time elapsed over the course of the multiple iterations can be compared to a threshold time, and if the amount of elapsed time exceeds the threshold time, another iteration of the operation 606 is not performed. In some implementations, the condition corresponds to a number of performed iterations of the operation 606 exceeding a threshold number of iterations. In some implementations, multiple conditions are checked at the operation 618, and if any of the conditions is satisfied, the process 600 proceeds to an operation 620 in which a next planned path is generated, and the process 600 is repeated to move to the robot 100 to a waypoint at least partially defining the next planned path.

As discussed above, at the operation 616, the trajectory along which the robot 100 is navigated can include one or more trajectories along the path as well as one or more trajectories that deviate from the path. FIGS. 7A-7F provide examples of these different types of trajectories. Referring back to FIG. 7A, the robot 100 advances along the trajectory 710. For example, also referring to FIG. 6, at the operation 602, the path 702 is generated. At the operation 604, an obstacle is not detected. The process 600 thus proceeds to the operation 618, in which the robot 100 proceeds along the trajectory 710 to advance along the path 702. The trajectory 710 can correspond to a trajectory in which the robot 100 moves at a default speed for the robot 100, e.g., during a coverage mode or during another mode apart from the obstacle avoidance mode.

FIGS. 7B-7D illustrate examples of the robot 100 moving along trajectories in an obstacle avoidance mode, e.g., as part of the operation 606. When the robot 100 is in the position shown in FIG. 7B, the robot 100 detects the obstacle 700 (e.g., at the operation 604). The process 600 proceeds to the operation 606, in which the obstacle avoidance mode of the robot 100 is initiated. At the operations 608, 610, 612, alternative trajectories to avoid the obstacle 700 are generated, and a trajectory 712 is selected to avoid the obstacle 700. The trajectory 712 can correspond to the highest scoring trajectory of the alternative trajectories. In the example shown in FIG. 7B, the trajectory 712 is a trajectory to move the robot 100 at a reduced speed, e.g., reduced relative to the speed of the robot 100 along the trajectory 710 shown in FIG. 7A. In this regard, the trajectory 712 can be a template trajectory, e.g., determined at the operation 608. The robot 100 is then navigated along the trajectory 712 in an iteration of the operation 616.

Figures 7E, 7F:
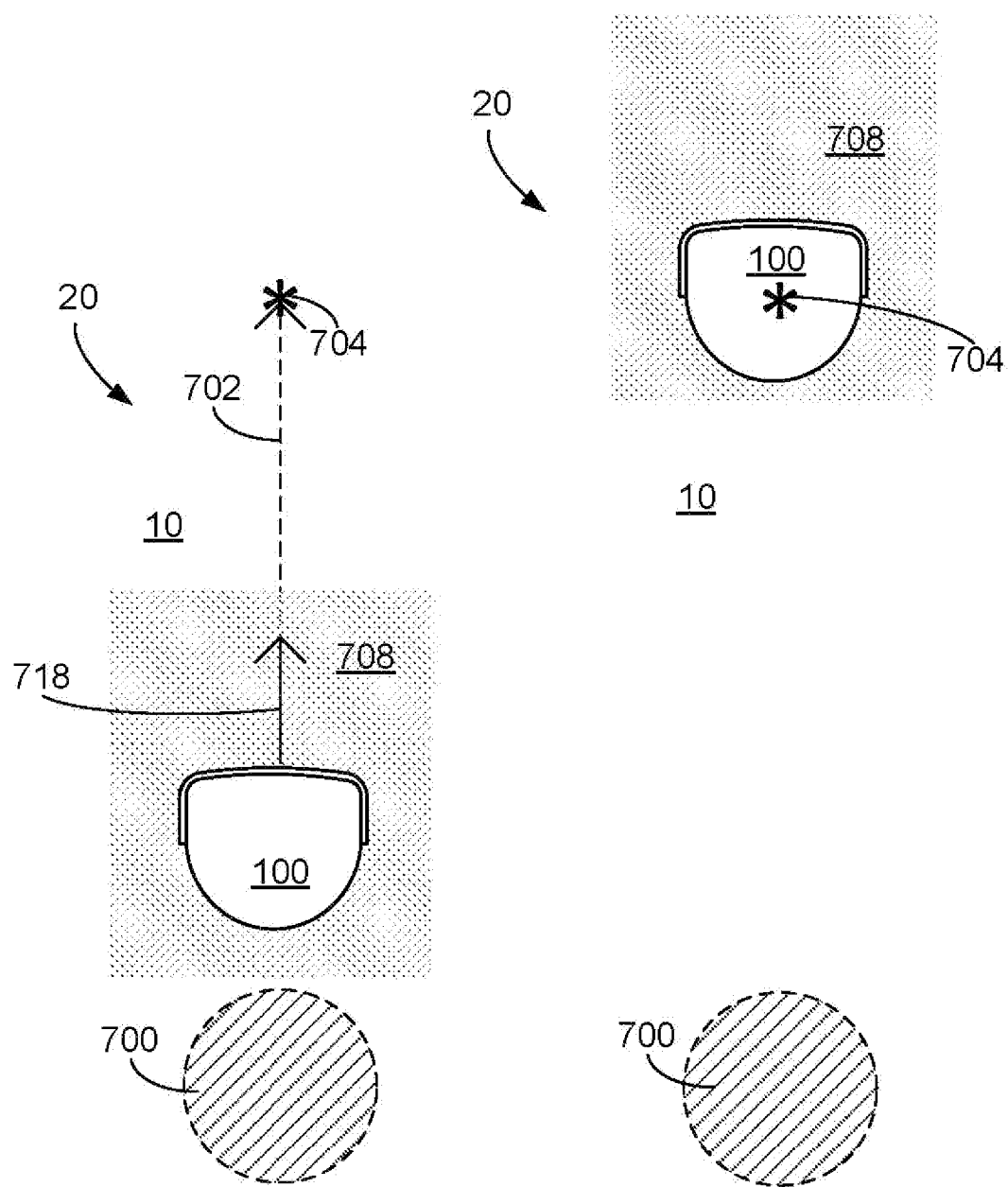

Further iterations of the operation 616 are shown in FIGS. 7C-7F. For example, referring to FIG. 7C, the robot 100 detects the obstacle 700 again. The trajectory selected as part of the operation 608 is a trajectory 714 to move the robot 100 along an arc trajectory that avoids the obstacle 700 and allow the robot 100 to move around part of the obstacle 700. Then, as shown in FIG. 7D, a trajectory 716 is selected to move the robot 100 along another arc trajectory to align a heading of the robot 100 with the path 702. Finally, as shown in FIG. 7E, the robot 100 is then moved along a trajectory 718 to move the robot 100 along the path 702, e.g., at a default speed. In some implementations, the trajectories 714, 716 can correspond to trajectories selected as part of the operation 606, and the trajectory 718 can correspond to a trajectory that is not selected as part of the operation 606. The trajectory 718 can be a selected trajectory that moves the robot 100 along the path 702, e.g., skipping the operation 606. Finally, as shown in FIG. 7F, when the robot 100 arrives at the waypoint 704, another waypoint can be generated or selected and another planned path can be generated, e.g., at the operation 620. The process 600 can be repeated for this next planned path.

The processes 500, 600 describe an obstacle avoidance mode in which a planned path is involved, e.g., at the operations 502, 508, 602, 620. A planned path need not be generated for the obstacle avoidance mode to be used. In some implementations, the obstacle avoidance mode allows for selection of an alternative obstacle avoidance trajectory without consideration of a planned path. For example, the alternative obstacle avoidance trajectory can be selected based on at least a similarity of the alternative obstacle avoidance trajectory to another trajectory. This other trajectory can be, for example, an originally selected trajectory that does not account for an obstacle detected by the robot 100, e.g., an obstacle in the local map of the robot 100. The scoring for each alternative obstacle avoidance trajectory determined by the controller 109 can be based on at least a difference between a drive parameter of the robot 100 for the originally selected trajectory and a drive parameter of the robot 100 for the alternative obstacle avoidance trajectory, e.g., a translational velocity of the robot 100, a rotational velocity of the robot 100, a heading of the robot 100, a parameter of the drive system of the robot 100, a parameter of drive wheels of the drive system of the robot 100, etc.

Figure 9:
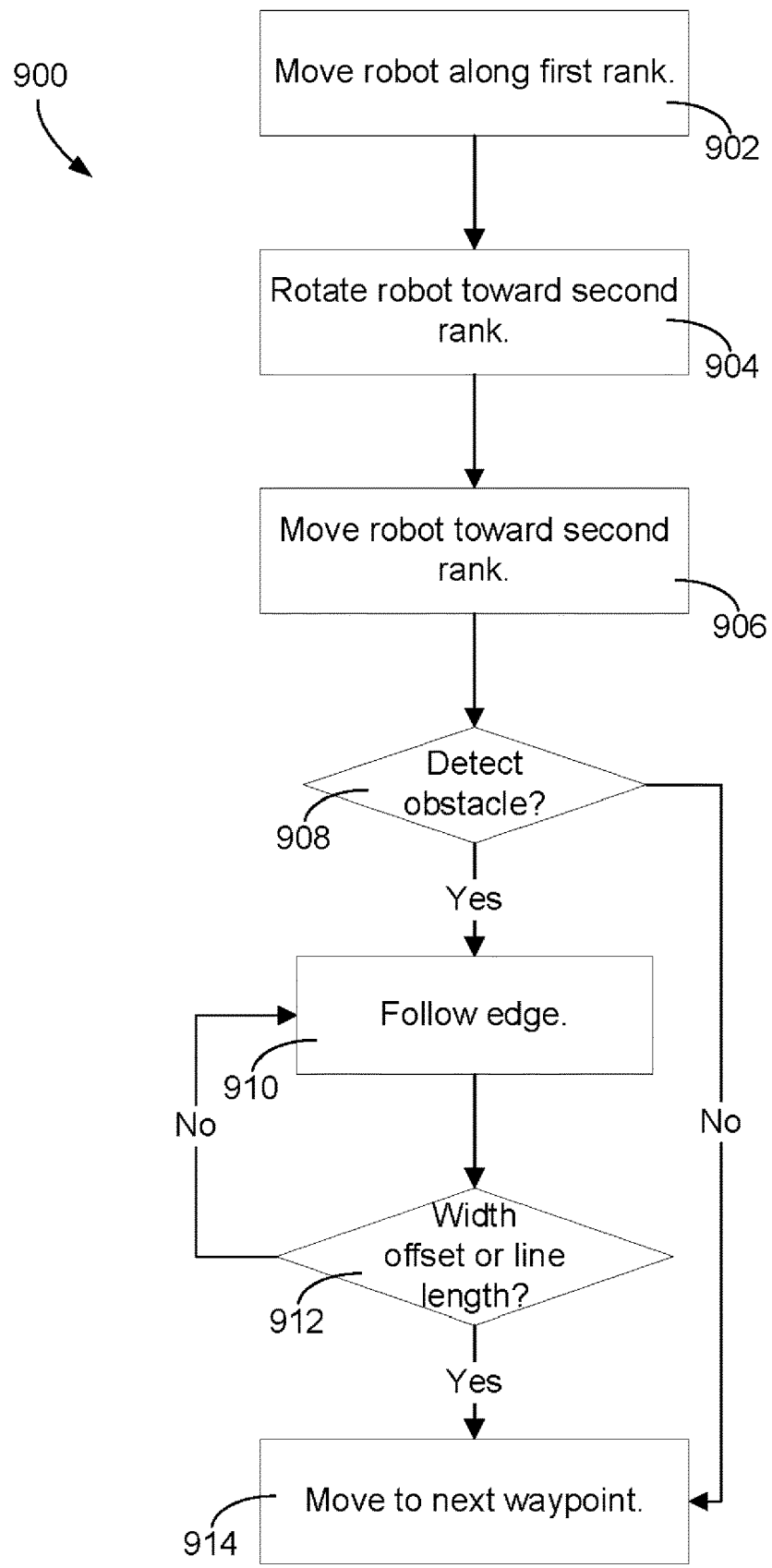
FIG. 9 is a flowchart of a process for controlling an autonomous cleaning robot to cover an area.

As discussed in this disclosure, the processes 500 and 600 for avoiding an obstacle and overriding trajectories for moving the robot 100 along a planned path to a waypoint can be executed during navigation of the robot 100 in different modes. FIG. 9 provides an example of a process 900 that can, in some implementations, incorporate the process 500, the process 600, or some operations of the process 500 and the process 600. The process 900 is a process executed during a coverage mode of the robot 100. FIGS. 10A-10F illustrate an example of the robot 100 during the process 900. FIGS. 10A-10F show the robot 100 moving along ranks during a coverage mode of the robot 100.

The process 900 is executed to navigate the robot 100 to cover an area while maintaining a threshold distance from obstacles near the area. In the process 900, the robot 100 is navigated in a coverage mode while avoiding contact with obstacles near the area.

At an operation 902 of the process 900, the robot 100 is moved along a first rank. For example, referring to FIG. 10A, the robot 100 is operating in a coverage mode to clean an area 1000. A path 1002 includes ranks 1004a-1004f and transition segments 1006a-1006e between the ranks 1004a-1004f. At the operation 904, the robot 100 moves along the rank 1004a. In some implementations, an obstacle may block a portion of a rank. In this regard, the obstacle may trigger operations of the process 500 or the process 600. For example, the path 1002 or portions of the path 1002 can be considered a planned path as described with respect to the process 500 and the process 600, and the obstacle along this planned path can trigger an operation that initiates the obstacle avoidance mode of the robot 100, e.g., the operation 506 or the operation 606.

At an operation 904 of the process 900, the robot 100 reaches an end of the first rank. In particular, the controller 109 can determine that a location of the robot 100 correspond to an end of the first rank, e.g., using the global map and the localization methods described in this disclosure. And at an operation 906 of the process 900, the robot 100 is rotated toward a second rank. The robot 100 can be, for example, rotated in place toward the second rank. In the implementations represented in FIG. 10B, the robot 100 reaches an end of the rank 1004a (shown in FIG. 10A), e.g., at the operation 904. And at the end of the rank 1004a, the robot 100 is turned toward the rank 1004b, e.g., at the operation 906.

At an operation 908 of the process 900, an obstacle can be detected. In particular, the controller 109 determines whether an obstacle blocks a portion of the path on which the robot 100 is traveling. The obstacle can be detected in the manner discussed with respect to the operation 504 or the operation 604. If the obstacle is detected, the process 900 proceeds to an operation 910 to initiate an edge following mode. If an obstacle is not detected, the process 900 proceeds to an operation 914 to proceed to the next waypoint.

Figure 10A:
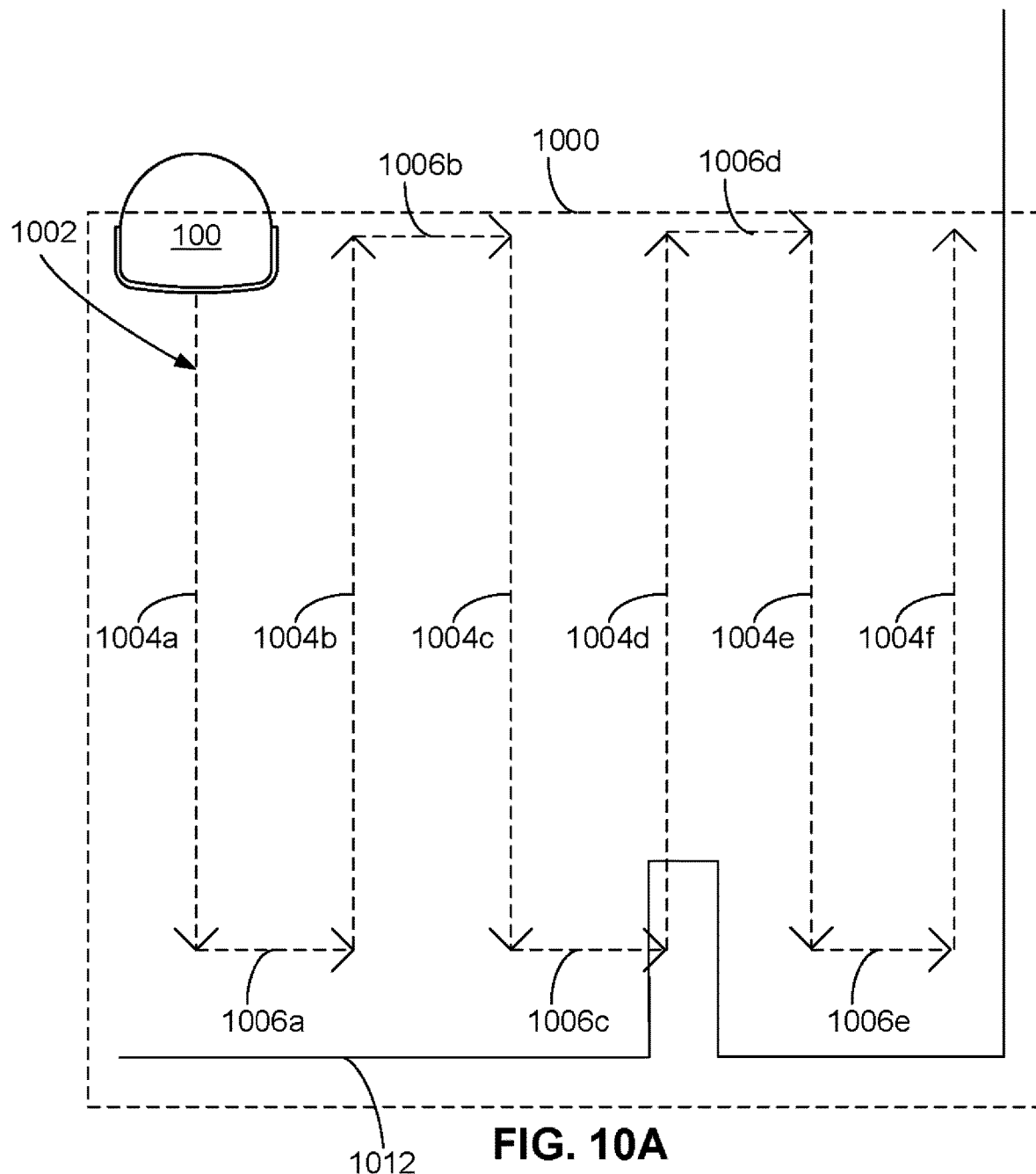
FIGS. 10A-10F are top views of an autonomous cleaning robot moving along a path to cover an area and moving around obstacles.
Figure 10B:
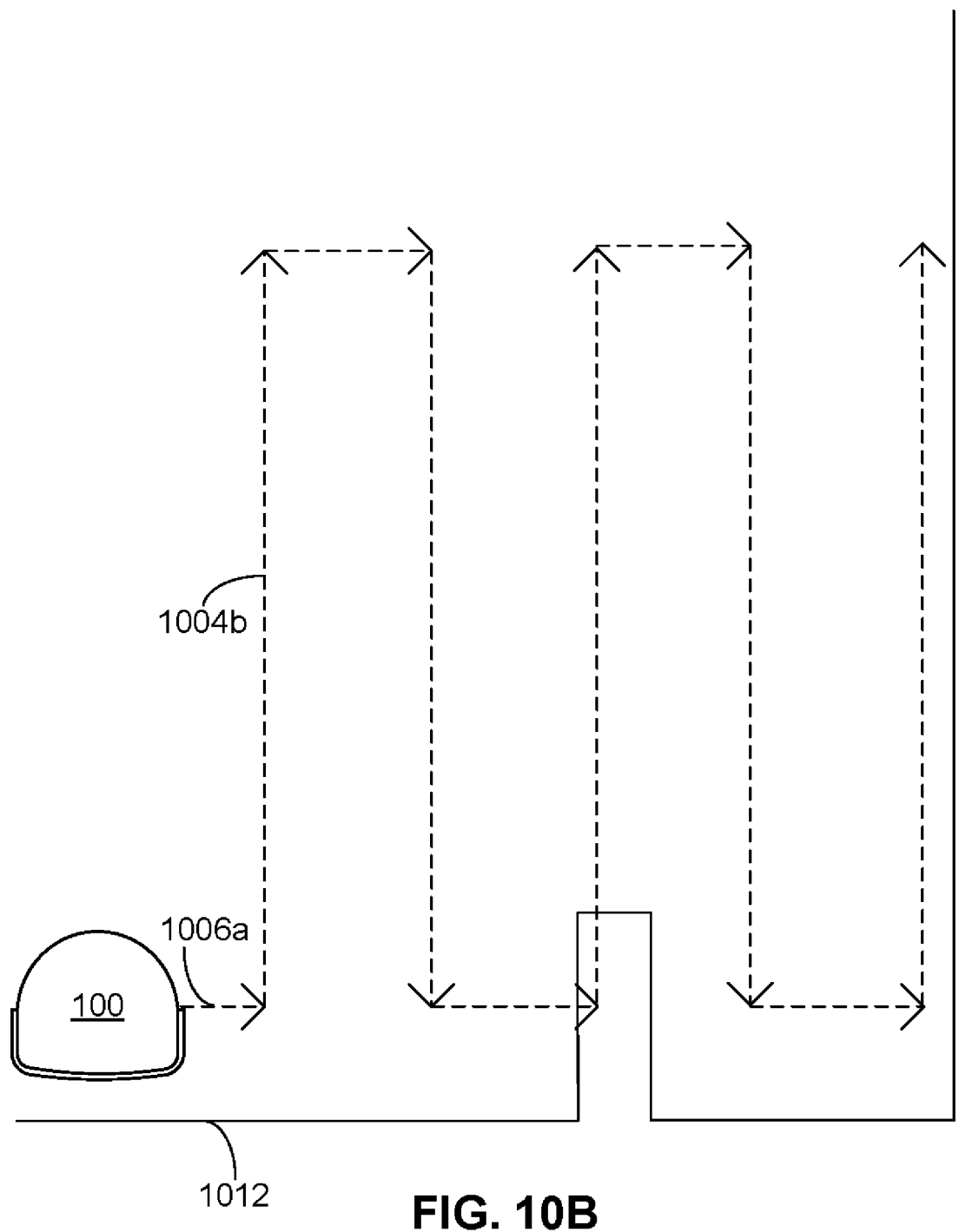
Figure 10C:
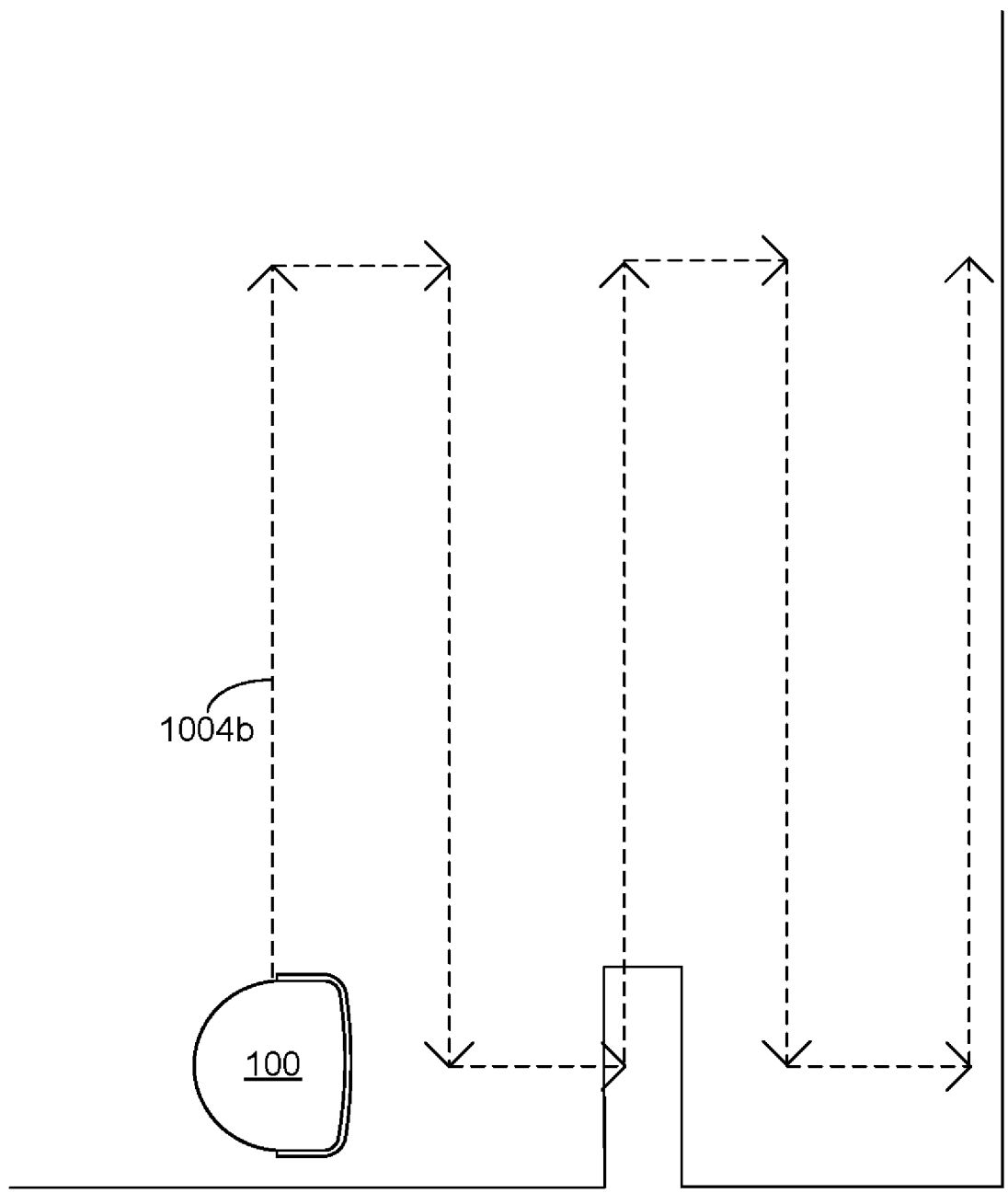

In the implementations represented in FIG. 10C, after the robot reaches the end of the rank 1004a as shown in FIG. 10B, the robot 100 does not detect an obstacle blocking a path of the robot 100 (e.g., at the operation 908) and the robot 100 is accordingly moved forward to a start of the rank 1004b (e.g., at the operation 914). The robot 100 proceeds to move along the path 1002, e.g., along the rank 1004b, along the transition segment 1006b, and then along the rank 1004c.

Figure 10D:
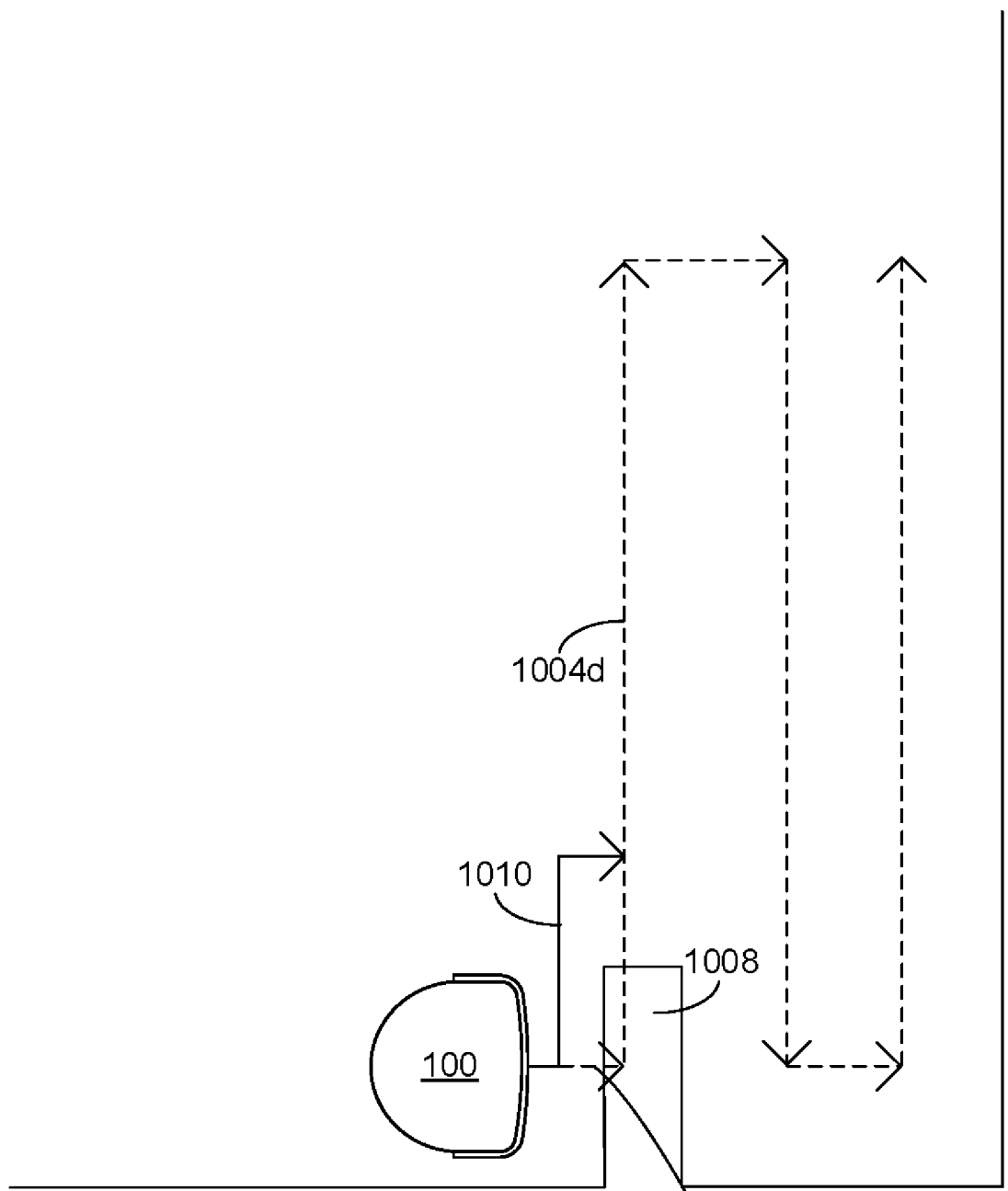

Then, as shown in FIG. 10D, after the robot 100 is rotated toward the rank 1004d (e.g., at the operation 906), the robot 100 detects an obstacle 1008 blocking the path of the robot 100 and, in particular, blocking a portion of the transition segment 1006c. The process 900 then proceeds to the operation 910.

At the operation 910, an edge following mode is initiated. In the edge following mode, the robot 100 follows an edge of the obstacle 1008. For example, as shown in FIG. 10D, the robot 100 is moved along an edge following path 1010 to avoid collision with the obstacle 1008. In the edge following mode, the robot 100 can maintain an edge following distance (as discussed in this disclosure) from the obstacle 1008.

At the operation 912, during the edge following mode, the controller 109 determines whether the robot 100 has traveled a width offset from the first rank or whether the robot 100 traveled a particular line length from the endpoint of the first rank. The width offset corresponds to a distance traveled along an axis perpendicular to the ranks, and the line length corresponds to a distance traveled along an axis parallel to the ranks. The width offset corresponds to a length of the transition segments 1006a-1006e. In implementations, the width offset can be between 50% and 100% of the width W1 (shown in FIG. 3A) of the robot 100. The line length corresponds to a length of the ranks 1004a-1004e. The length of the ranks 1004a-1004e can be between 5 to 15 times a length of the robot 100 (which can be substantially equal to the width W1 of the robot 100).

In the example shown in FIG. 10D, the edge following path 1010 stops at the rank 1004d, as the controller 109 would determine that the robot 100 has traveled the width offset in the edge following mode in response to the robot 100 reaching the rank 1004d. Then, the robot 100 is controlled to move to the next waypoint (e.g., at the operation 914) and is thereby moved along the rank 1004d toward the end of the rank 1004d.

Figure 10E:
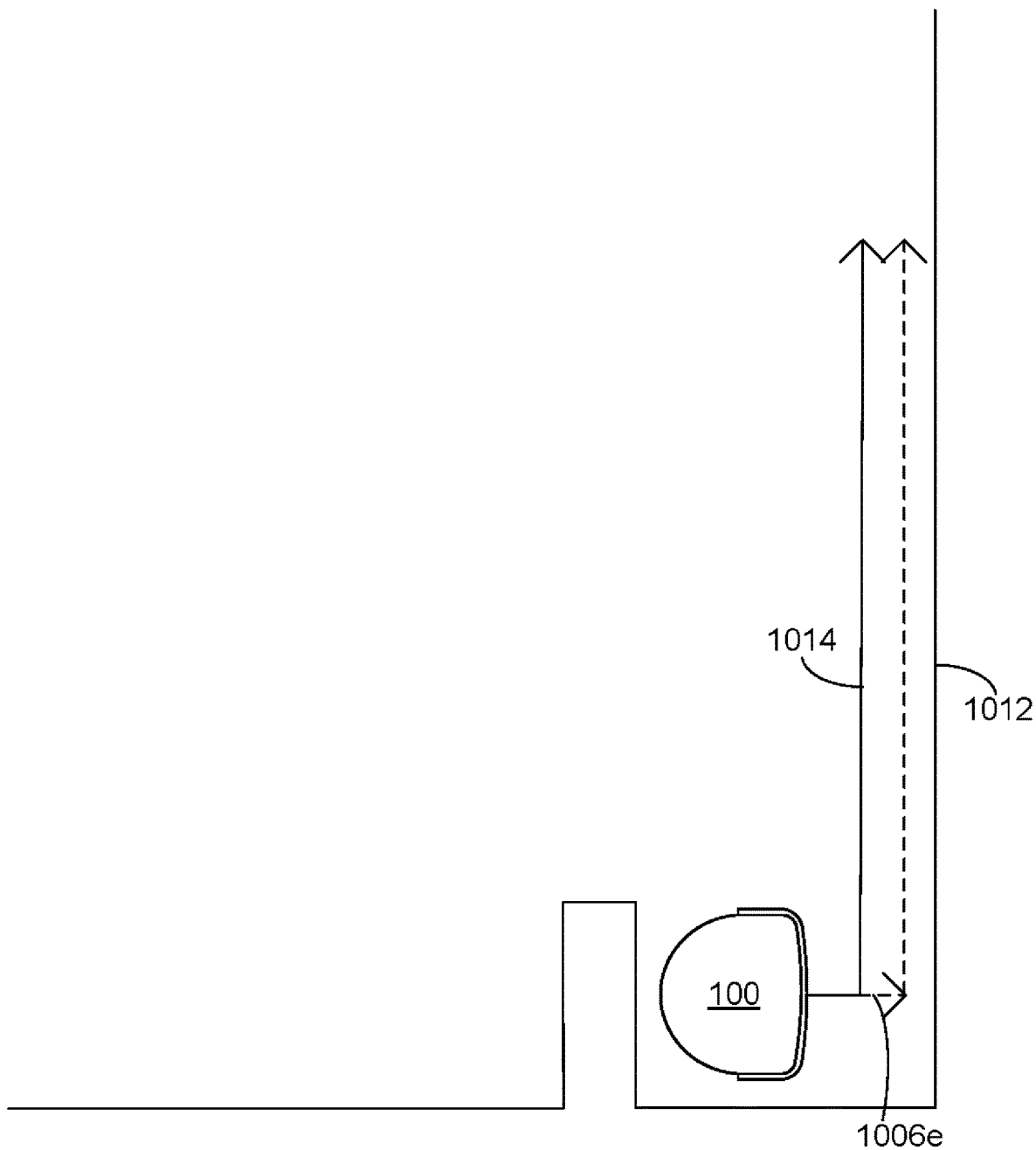
Figure 10F:
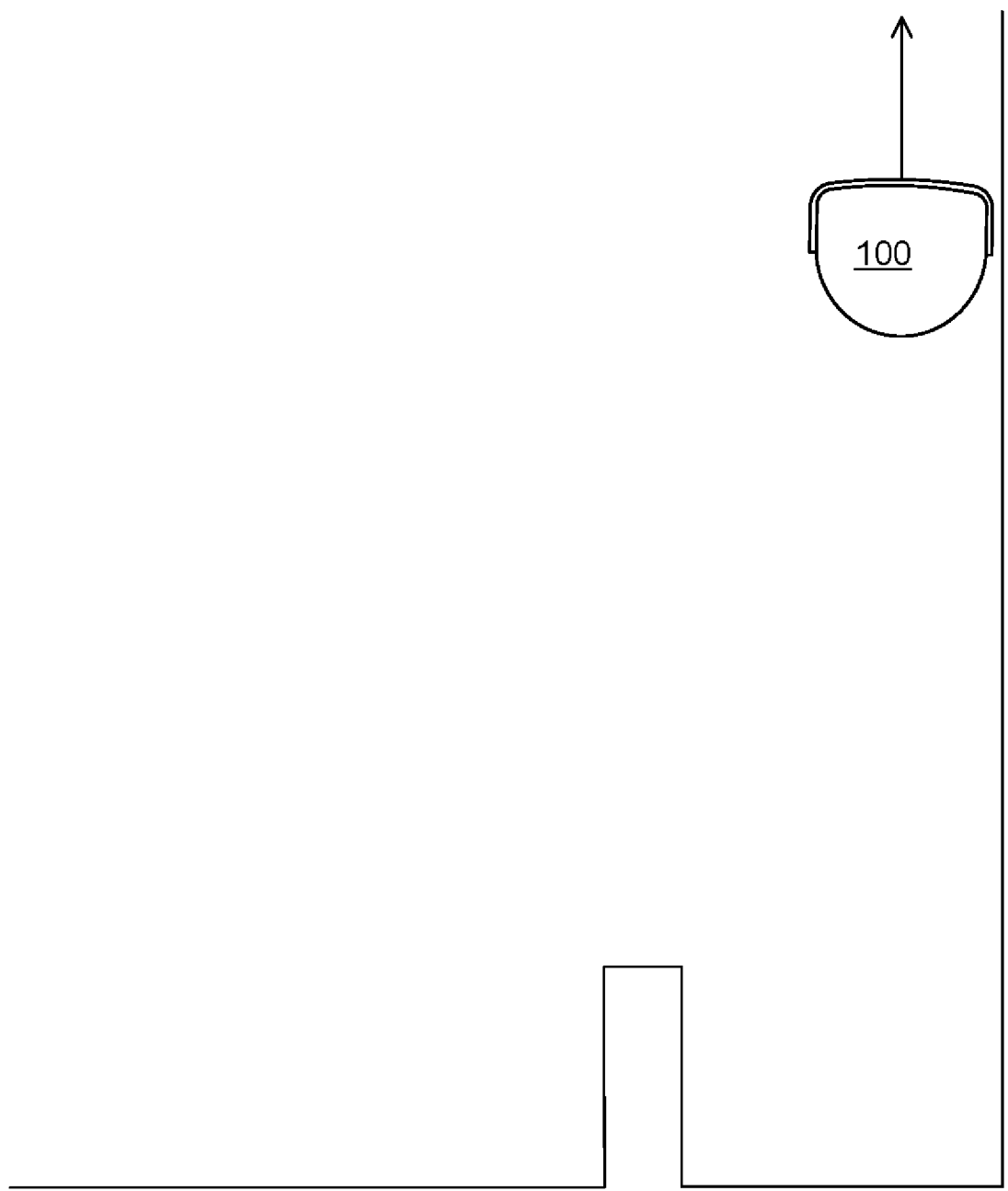

Referring to FIG. 10E, after the robot 100 is controlled to navigate along the ranks 1004d, 1004e, the robot 100 is rotated in place toward the rank 1004f. In the example shown in FIG. 10E, the robot 100 detects a wall 1012 that blocks the robot 100 from traveling through an entirety of the transition segment 1006e. In other words, in this example, the robot 100 detects an obstacle at the operation 908. The process 900 proceeds to the operation 910, in which the edge following mode is initiated, causing the robot 100 to be navigated along an edge following path 1014 along the wall 1012. Unlike the example shown in FIG. 10D where the robot 100 is moved to a position offset from the rank 1004 by at least the width offset, the robot 100 is unable to move to such a position. Rather the robot 100 is controlled to continue to move along the wall 1012 until the robot 100 reaches the position shown in FIG. 10F. In the position of the robot 100 in FIG. 10F, the robot 100 has traveled at least the line length. The process 900 proceeds to the operation 914, at which point the robot 100 has completed coverage of the area 1000. The next waypoint that the robot 100 travels to at the operation 914 can correspond a waypoint generated as part of a coverage mode for another area. Alternatively, the next waypoint that the robot 100 travels to at the operation 914 can correspond to a waypoint generated as part of a travel mode. In the travel mode, the robot 100 is moved to another area where the robot 100 is operated in a coverage mode. Other waypoints for the robot 100 are possible in other implementations.

FIGS. 11A-11G illustrate examples of trajectories that the robot 100 can select and move along in response to a command to rotate the robot 100 in place. The operations represented in FIGS. 11A-11G can occur, for example, when the robot 100 rotates in place to move along a transition segment during a coverage mode (e.g., one of the transition segments 1006a-1006e), or when the template trajectory to rotate in place is selected during the operation 606.

Figure 11A:
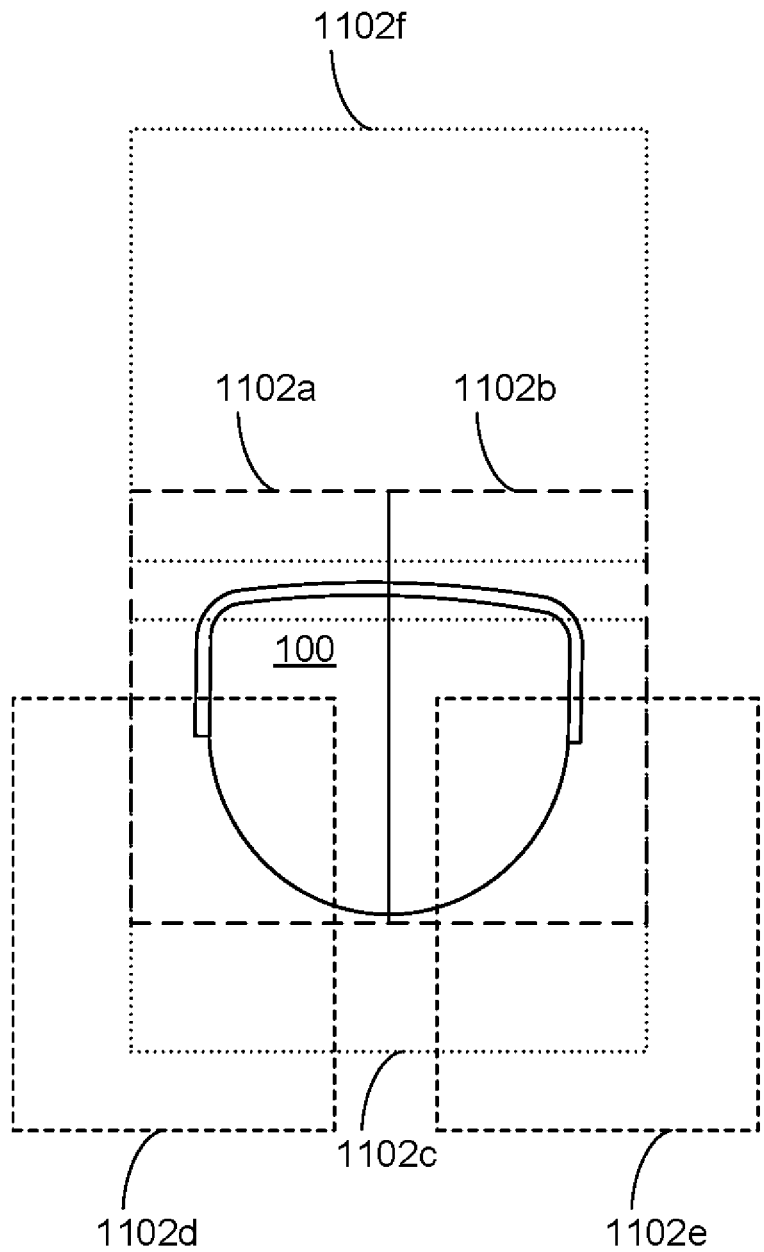
FIGS. 11A-11G are top views of an autonomous cleaning robot moving along a trajectory to rotate in place.

Referring to FIG. 11A, the controller 109 of the robot 100 can determine, using the local map, whether one or more obstacles are present in areas 1102a-1102e. The area 1102a corresponds to an area with a center offset rearwardly relative to a center of the robot 100, e.g., offset by 1 to 20 centimeters from the center of the robot 100. In particular, a right edge of the area 1102a can be aligned with the center of the robot 100, and the width of the area 1102a can be equal to the sum of a minimum radius of the robot 100 (e.g., a radius of the semicircular rear portion of the robot 100) and a maximum radius of the robot 100 (e.g., a radial distance to a corner of the rectangular front portion of the robot 100). The area 1102b corresponds to an area with a center offset laterally to the left of the center of the robot 100, e.g., offset 1 to 20 centimeters laterally to the left of the center of the robot 100. The area 1102c corresponds to an area with a center offset laterally to the right of the center of the robot 100, e.g., offset 1 to 20 centimeters laterally to the right of the center of the robot 100. In particular, a left edge of the area 1002b can be aligned with the center of the robot 100, and the width of the area 1002b can be equal to the sum of a minimum radius of the robot 100 (e.g., a radius of the semicircular rear portion of the robot 100) and a maximum radius of the robot 100 (e.g., a radial distance to a corner of the rectangular front portion of the robot 100).

The area 1102d corresponds to an area with a center offset rearwardly and laterally to the left of the center of the robot 100, e.g., offset by 1 to 20 centimeters rearwardly from the center of the robot 100 and 1 to 20 centimeters laterally to the left of the center of the robot 100. The area 1102e corresponds to an area with a center offset rearwardly and laterally to the right of the center of the robot 100, e.g., offset by 1 to 20 centimeters rearwardly from the center of the robot 100 and 1 to 20 centimeters laterally to the left of the center of the robot 100. The area 1102f corresponds to an area with a center offset in front of the center of the robot 100, e.g., offset by 1 to 20 centimeters in front of the center of the robot 100.

Figure 11B:
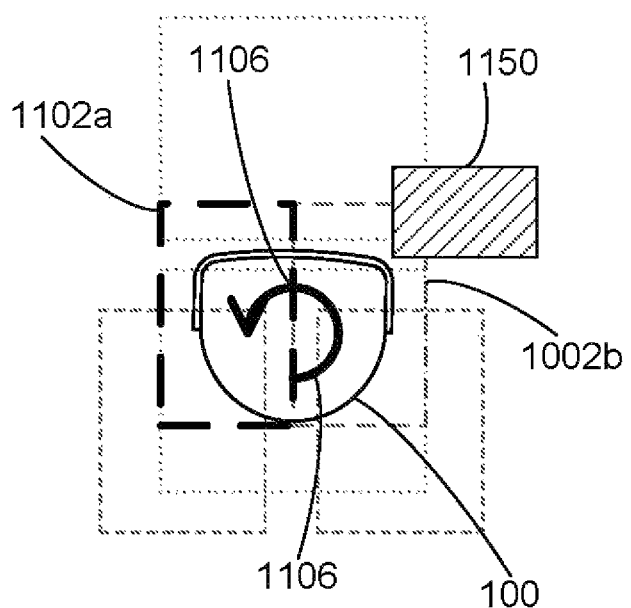

Referring to FIG. 11B, in a process to rotate the robot 100 in place, the controller 109 first determines whether an obstacle is present in the areas 1102a-1102b. Because the robot 100 does not have a circular geometry, the presence of an obstacle in the area 1102a or the area 1102b can prevent the robot 100 from rotating in place. First, in the process to rotate the robot 100 in place, the controller 109 determines whether obstacles are present in the area 1102a and the area 1102b. In some implementations, the controller 109 makes these determinations at the same time, e.g., determine whether obstacles are present in the area 1102a and determines whether obstacles are present in the area 1102b. Alternatively, the controller 109 makes these determinations sequentially.

For example, referring to FIG. 11B, if an obstacle is not present in the area 1102a, the robot 100 can be controlled to move along a trajectory 1106 to rotate in a clockwise direction, as rotation in the clockwise direction would cause the front portion of the robot 100 to move into the area 1102a, where no obstacle is present. In some implementations, the obstacle could be located in the area 1102b. As a result, rotation in the clockwise direction would not result in collision between the robot 100 and the obstacle. For example, as shown in FIG. 11B, an obstacle 1150 is not present in the area 1102a, so the robot 100 is controlled to move along the trajectory 1106 to rotate in the clockwise direction to avoid collision with the obstacle 1150.

Figure 11C:
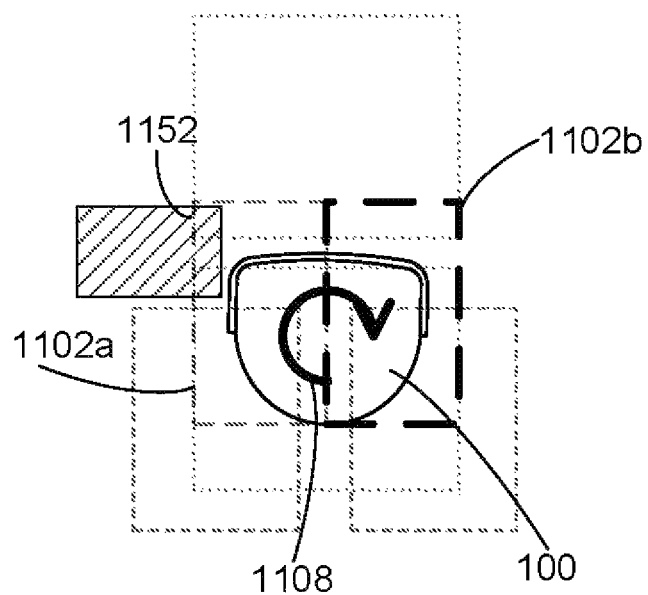

Referring to FIG. 11C, if an obstacle is detected in the area 1102a, the controller 109 proceeds to determine whether obstacles are present in the area 1102b. If an obstacle is not present in the area 1102b, the robot 100 can be controlled to move along a trajectory 1108 to rotate in a counterclockwise direction, as rotation in the counterclockwise direction would cause the front portion of the robot 100 to move into the area 1102b, where no obstacle is present. In implementations, the obstacle could be located in the area 1102a. As a result, rotation in the counterclockwise direction would not result in collision between the robot 100 and the obstacle. For example, as shown in FIG. 11C, an obstacle 1152 is not present in the area 1102b, so the robot 100 is controlled to move along the trajectory 1106 to rotate in the counterclockwise direction to avoid collision with the obstacle 1152.

If the determinations described with respect to FIGS. 11B-11C occur simultaneously, the controller 109 can prioritize rotation in one direction over rotation in the other direction. Particularly, if the robot 100 is being controlled to move along a planned path (e.g., defined in part by a waypoint), the robot 100 can prioritize rotation in the direction that would adjust the heading of the robot 100 to be in the direction of the waypoint or the planned path.

Figure 11D:
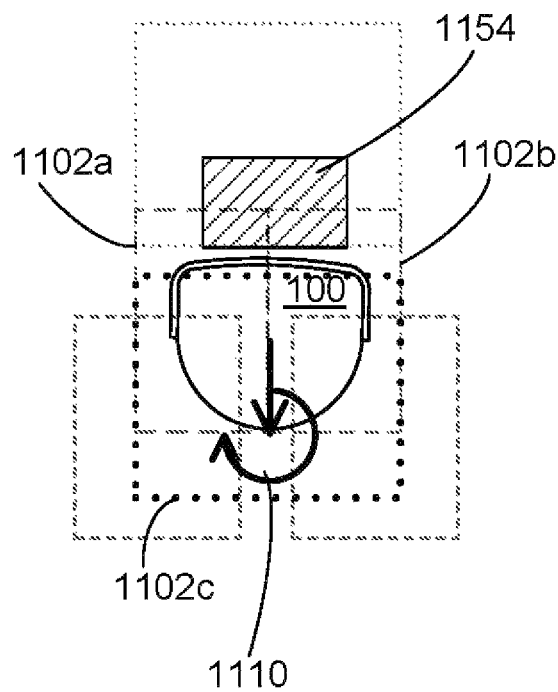

Referring to FIG. 11D, if an obstacle is detected in the areas 1102a-1102b, the controller 109 proceeds to determine whether obstacles are present in the area 1102c. If an obstacle is not present in the area 1102c, the robot 100 can be controlled to move along a trajectory 1110 to move rearwardly and rotate in a clockwise direction. The rearward movement allows the robot 100 to avoid collision with an obstacle 1154 in the areas 1102a-1102b when the robot 100 rotates in place. In other implementations, the robot 100 can move rearwardly and rotate in a counterclockwise direction.

Figure 11E:
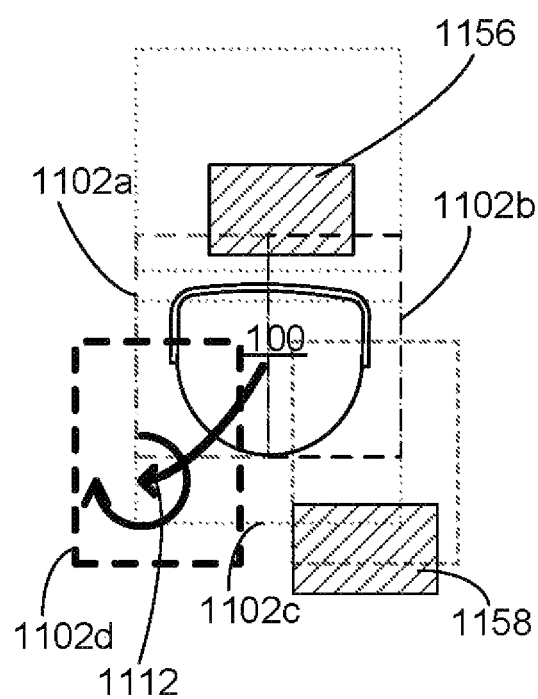

Referring to FIG. 11E, if an obstacle is detected in the areas 1102a-1102c, the controller 109 proceeds to determine whether obstacles are present in the area 1102d and the area 1102e. In some implementations, the controller 109 makes these determinations at the same time, e.g., determine whether obstacles are present in the area 1102d and determines whether obstacles are present in the area 1102e. Alternatively, the controller 109 makes these determinations sequentially.

For example, referring to FIG. 11E, if an obstacle is detected in the areas 1102a-1102c, the controller 109 proceeds to determine whether obstacles are present in the area 1102d. If an obstacle is not present in the area 1102d, the robot 100 can be controlled to move along a trajectory 1110 to move rearwardly along an arc in the direction of the area 1102d (e.g., to the left) and rotate in a clockwise direction. The rearward and leftward movement allows the robot 100 to avoid collision with obstacles 1156, 1158 in the areas 1102a-1102c when the robot 100 rotates in place. In other implementations, the robot 100 can move rearwardly along the arc and rotate in a counterclockwise direction.

Figure 11F:
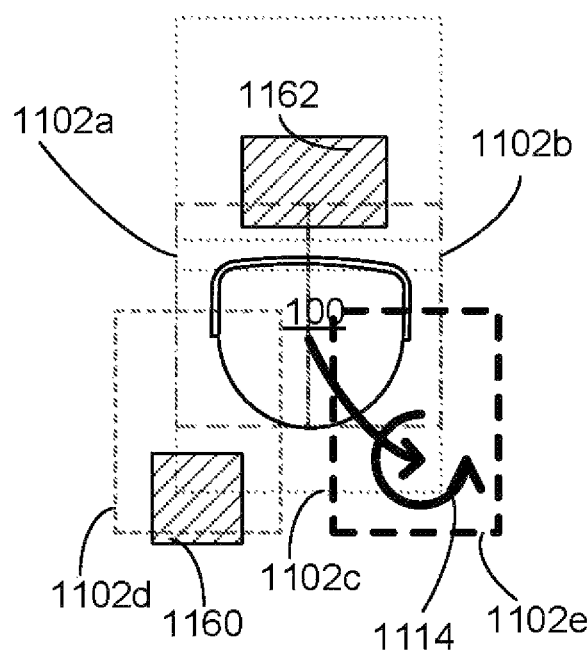

Referring to FIG. 11F, if an obstacle is detected in the areas 1102a-1102d, the controller 109 proceeds to determine whether obstacles are present in the area 1102e. If an obstacle is not present in the area 1102e, the robot 100 can be controlled to move along a trajectory 1112 to move rearwardly along an arc in the direction of the area 1102e (e.g., to the right) and rotate in a clockwise direction. The rearward and leftward movement allows the robot 100 to avoid collision with an obstacle 1160 in the areas 1102c-1102d and an obstacle 1162 in the areas 1102a-1102b when the robot 100 rotates in place. In other implementations, the robot 100 can move rearwardly along the arc and rotate in a counterclockwise direction.

If the determinations described with respect to FIGS. 11E-11F occur simultaneously, the controller 109 can prioritize movement in one direction (to the left or to the right) over movement in the other direction. Particularly, if the robot 100 is being controlled to move along a planned path (e.g., defined in part by a waypoint), the robot 100 can prioritize rotation in the direction that would adjust the heading of the robot 100 to be in the direction of the waypoint or the planned path.

Figure 11G:
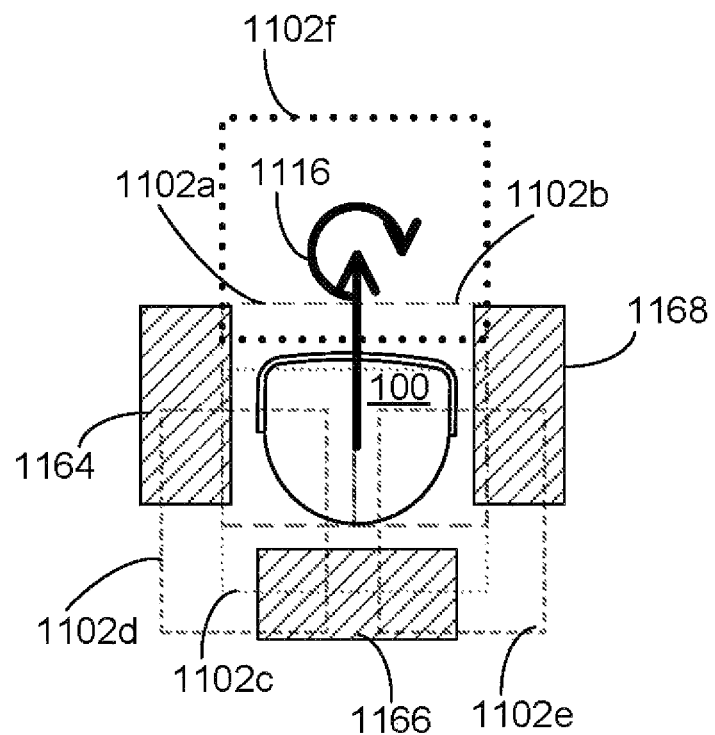

Referring to FIG. 11G, if an obstacle is detected in the areas 1102a-1102e, the controller 109 proceeds to determine whether obstacles are present in the area 1102f. If an obstacle is not present in the area 1102f, the robot 100 can be controlled to move along a trajectory 1114 to move in the forward direction in the direction of the area 1102f and rotate in a clockwise direction. The forward movement allows the robot 100 to avoid collision with obstacles 1164, 1166, 1168 in the areas 1102a-1102e when the robot 100 rotates in place. In other implementations, the robot 100 can move in the forward direction and rotate in a counterclockwise direction.

If the robot 100 is unable to rotate in any of the areas 1102a-1102f, the robot 100 may, in some implementations, be moved along a sequence of trajectories to attempt to move away from a current location of the robot 100. For example, the sequence of trajectories can include predetermined trajectories, including a rotation clockwise, a movement in a rearward direction, a rotation counterclockwise, a rotation to reverse a direction of the robot 100 (e.g., a rotation of about 180 degrees), and other trajectories. In some implementations, the controller 109 can determine exploration trajectories of these predetermined trajectories, e.g., several trajectories obtained from varying a speed value or speed values of the drive system of the robot 100 for a particular predetermined trajectory, to identify a trajectory that avoids obstacles that are blocking the robot 100 from rotating in the areas 1002a-1102f If the robot 100 cannot be moved in a way to make progress, e.g., be moved away from its current location blocked by the obstacles, the controller 109 can disable operation of the first obstacle avoidance mode using the local map and use the second obstacle avoidance mode using the bump sensor to complete a rotation in place while moving away from obstacles. For example, the local map used in the first obstacle avoidance mode can be generated using the ranging sensor 105.

Figure 12:
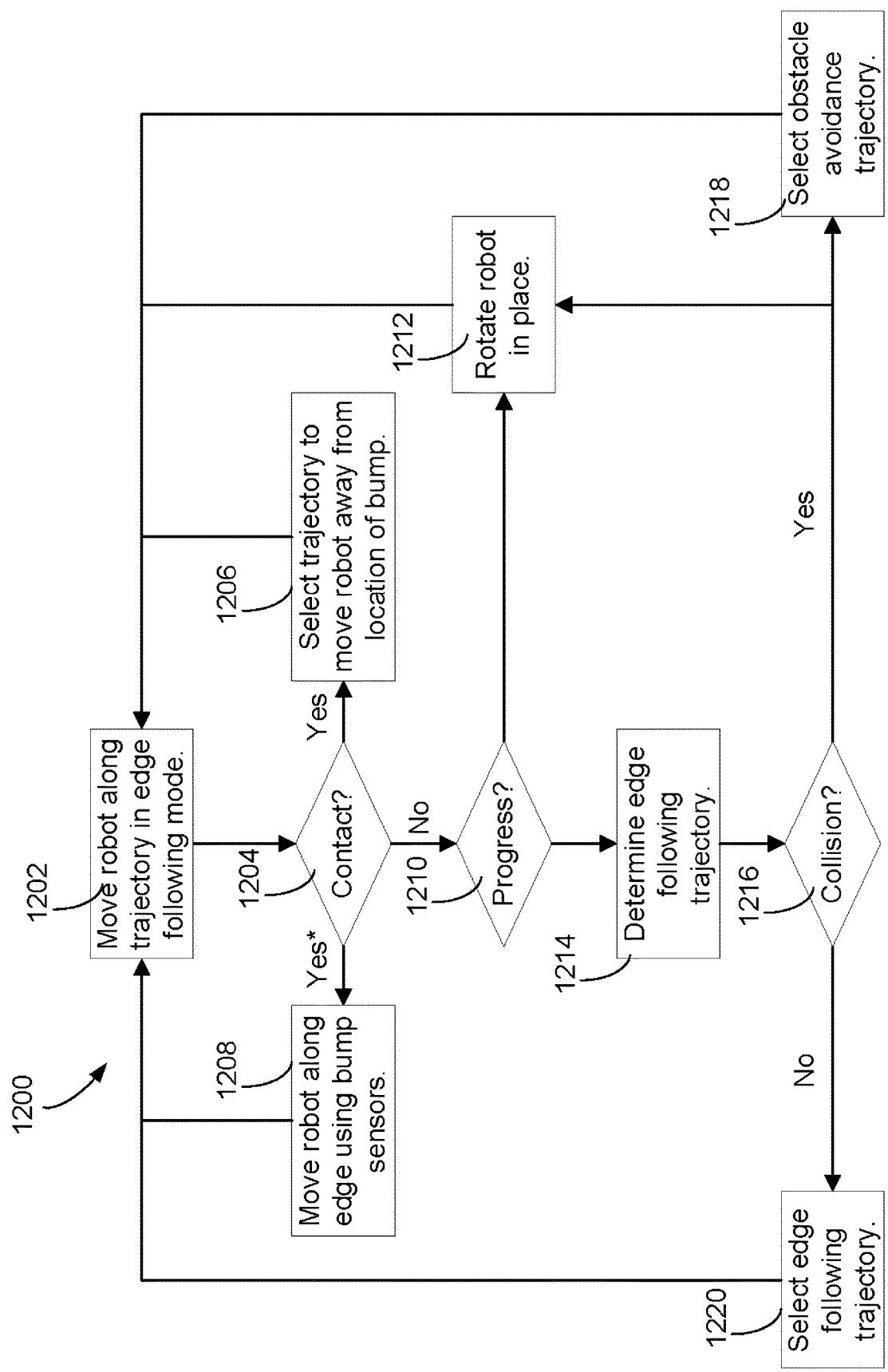
FIG. 12 is a flowchart of a process for controlling an autonomous cleaning robot to follow an edge.
Figure 13:
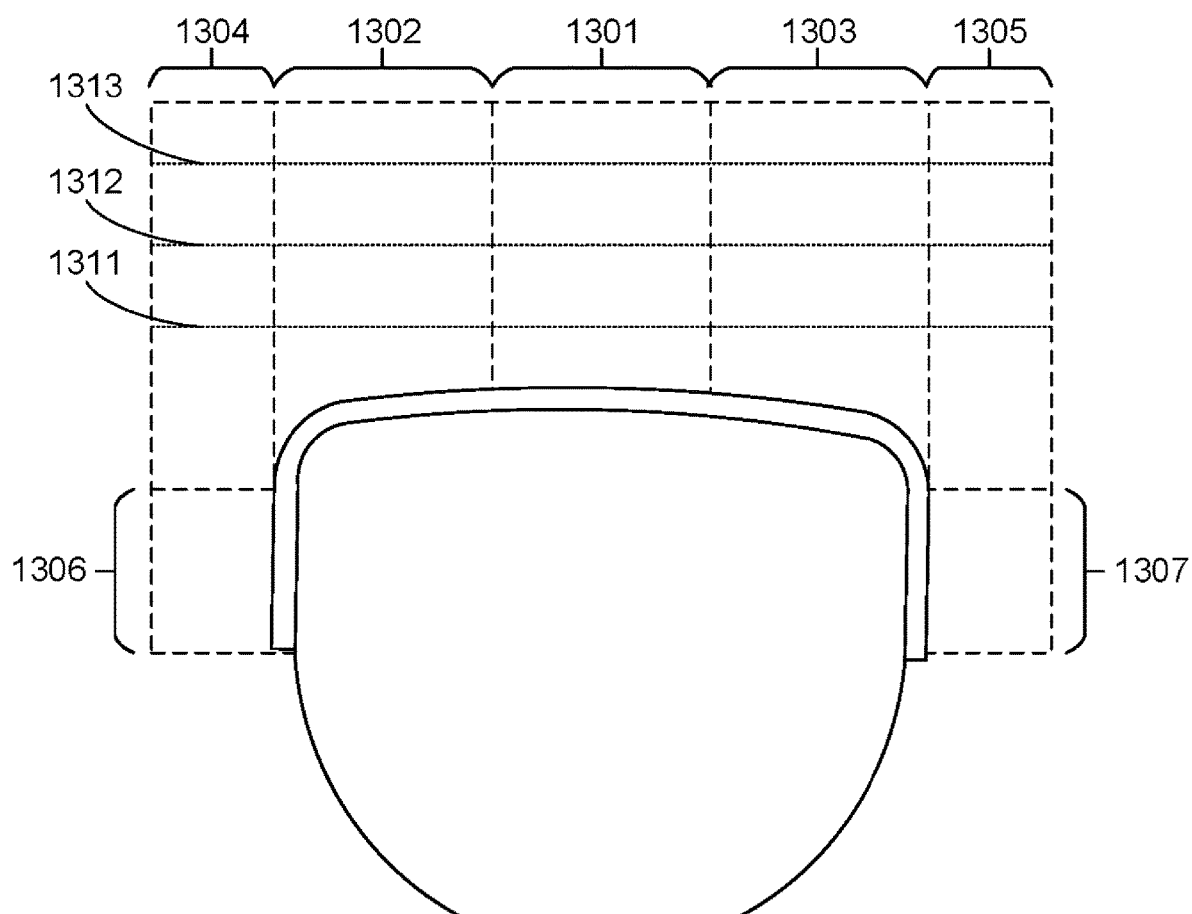
FIG. 13 is a top view of an autonomous cleaning robot and sectors for detecting an object in a vicinity of the autonomous cleaning robot.

FIG. 12 illustrates an example process 1200 in which the robot 100 is operated in an edge following mode that avoids contact with objects in the space 20. The edge following mode, for example, can be initiated as part of a gentle mode of the robot 100. In some implementations, the edge following mode can be initiated after a coverage mode, e.g., to perform a detailed clean of edges of obstacles in the space 20. In some implementations, the edge following mode can be initiated during another mode, with the robot 100 cleaning along an edge in the space 20 as the robot 100 is operated in the edge following mode in the other mode. For example, the edge following mode can be initiated during the coverage mode, e.g., at the operation 910 to move and clean along an edge of a detected obstacle.

At an operation 1202, the robot 100 is moved along a trajectory in an edge following mode. The process 1200 can begin at the operation 1202. In this regard, when the edge following mode is initiated, typically, the robot 100 is controlled to move along an edge in the edge following mode. The edge can correspond to an edge of a nontraversable portion of the space 20. In this regard, the edge can be defined by one or more objects in the space 20, e.g., an edge of a wall, an edge of an obstacle, an edge of another object in the space 20 that makes a portion of the space 20 nontraversable for the robot 100. The robot 100 can follow the edge such that a lateral side of the robot 100 (e.g., the lateral sides 149a-149b in FIG. 3B) faces the edge and maintains a distance from the edge.

At an operation 1204, the controller 109 can determine whether contact between the robot 100 and an object is detected. The contact can be detectable using a bump sensor of the robot 100. If contact is detected, the process 1200 can proceed to an operation 1206 or an operation 1208. Typically, if contact is detected, the contact does not represent one of several contacts occurring in a short period of time (as discussed in this disclosure), and the contact corresponds to an object represented in a local map of the robot 100, then the process 1200 proceeds to the operation 1206. At the operation 1206, a trajectory is selected to move the robot 100 away from the location of the contact. Then, at the operation 1202, the robot 100 can be controlled to move away from the location of the contact along the trajectory selected at the operation 1206. For example, if the object is in front of the robot 100, the robot 100 can move in a rearward direction away from the object.

In some implementations, the process 1200 proceeds to the operation 1208 if the robot 100 detects contact and further has detected a threshold cumulative number of contacts in a short period of time, e.g., 3 to 10 bumps within 3 to 10 seconds. The process 1200 can alternatively proceed to the operation 1208 if the robot 100 detects contact using the bump sensor of the robot 100 but does not detect a corresponding object in the space 20 in the local map. For example, referring also to FIG. 13, the controller 109 can determine a location of an object relative to sectors 1301-1307 in a vicinity of the robot 100 using a local map of the robot 100. At the operation 1204, the controller 109 can populate the sectors 1301-1307 with data indicative of locations of objects in the vicinity of the robot 100, e.g., in any of the sectors 1301-1307.

The sector 1301 is a central sector forward of the robot 100. The sector 1302 is positioned to the left of the sector 1301 and extends to the left lateral side of the robot 100. The sector 1303 is positioned to the right of the sector 1301 and extends to the right lateral side of the robot 100. The sector 1304 is positioned to the left of the sector 1302, and the sector 1305 is positioned to the right of the sector 1303. The sectors 1304, 1305 can have widths smaller than the sectors 1301-1303, e.g., 50% to 90% of the widths of the sectors 1301-1303. In some implementations, the sectors 1304, 1305 have the same widths as the sectors 1301-1303. The sector 1306 is rearward of the sector 1304 and extends to the rear end of the front portion of the robot 100, and the sector 1307 is rearward of the sector 1305 and extends to the rear end of the front portion of the robot 100. Furthermore, the controller 109 can determine a distance of an object in a forward direction of the robot 100, e.g., relative to lines 1311, 1312, 1313 positioned at varying distances from the robot 100, with the line 1311 being the closest line, the line 1313 being the farthest line, and the line 1312 positioned between the line 1311 and the line 1313. The line 1311 is positioned a distance from the robot 100 between 5% and 25% of the overall length of the robot 100, the line 1312 is positioned a distance from the robot 100 between 15% and 35% of the overall length of the robot 100, and the line 1313 is positioned a distance from the robot 100 between 25% and 45% of the overall length of the robot 100.

Returning to FIG. 12, at the operation 1204, the controller 109 can populate the sectors 1301-1307 with information from the local map generated by the robot 100. At the operation 1206, the controller 109 can determine whether a location of the contact corresponds to a location of an object represented in the sectors 1301-1307 and hence represented in the local map. For example, if the location of the contact is along a forward portion of the bumper of the robot 100, the controller 109 can check that an object is located in one of the sectors directly forward of the robot 100, e.g., any one of the sectors 1301-1303. If the controller 109 detects contact and determines that the location of the contact corresponds to the location of an object in the sectors 1301-1303, then the process 1200 can proceed to the operation 1206. If the controller 109, however, detects contact and determines that a corresponding object is not present in any of the sectors 1301-1303, then the process 1200 can proceed to the operation 1208. This could occur, for example, if the ranging sensor 105 of the robot 100 cannot detect an object in the space 20 due to an optical feature of a surface of the object, e.g., a reflectivity of the surface of the object.

In the event of multiple contacts in a short period of time or in the event that an object corresponding to the contact is not present in the sectors 1301-1307, at the operation 1208, the robot 100 is moved along the edge using bump sensors. In particular, the robot 100 can be operated in another edge following mode distinct from the edge following mode of the operation 1202. The edge following mode in the operation 1202 can correspond to a first edge following mode in which the robot 100 is controlled based on information from the ranging sensor 105, while the edge following mode in the operation 1208 can correspond to a second edge following mode in which the robot 100 is controlled based on information from the bump sensor of the robot 100. In some implementations, the robot 100 can further be controlled based on proximity sensors of the robot 100 distinct from the ranging sensor 105, e.g., infrared or ultrasonic sensors positioned along a forward portion of the robot 100.

If contact is not detected at the operation 1204, at an operation 1210, the controller 109 determines whether the robot 100 is making progress in the edge following mode. For example, the controller 109 can determine whether progress is being made based on translation or rotation of the robot 100. If the robot 100 is translating along the floor surface 10 or is rotating in a direction along the floor surface 10, the controller 109 can determine that progress is being made in the edge following mode. In some implementations, the controller 109 can determine that progress is being made based on whether the robot 100 is oscillating between different discrete states. For example, the controller 109 can track states of trajectories that the robot 100 is moved along at the operation 1202, and oscillation between two or more of these states can indicate that the robot 100 is not making progress in the edge following mode. The states can vary in implementations. In some implementations, the states can include a forward movement state, a backward movement state, a state corresponding to rotation toward an edge being followed by the robot 100 in the edge following mode, a state corresponding to rotation away from the edge being followed by the robot 100 in the edge following mode, and a state corresponding to a trajectory that swerves the robot 100 away from the edge being followed by the robot 100 (e.g., along a shallow arc). Each trajectory that the robot 100 is moved along at the operation 1202 can be classified into one of the states, and a predetermined number of prior states can be tracked by the controller 109 to determine whether the trajectories are oscillating between states. For example, if the most recent four states oscillate between the forward movement state and the backward movement state, the controller 109 can determine that the robot 100 is not making progress.

If the controller 109 determines that the robot 100 is not making progress, at an operation 1212, the robot 100 can be rotated in place by a small amount, e.g., by 5 to 20 degrees. This can allow a new trajectory to be determined for the robot 100 by providing a different detection area for sensors of the robot 100, e.g., for the ranging sensor 105. The different detection area can provide different selectable alternative trajectories for the robot 100, and allow the controller 109 to select a trajectory that moves the robot 100 away from a current location of the robot 100 so that the robot 100 can make progress.

If the controller 109 determines that the robot 100 is making progress, at an operation 1214, an edge following trajectory is determined. For example, the edge following trajectory that is determined can depend on a location of an object detected in the sectors 1301-1307 and relative to the lines 1311-1313.

In some implementations, at the operation 1214, if an object is located in one of the sectors 1301-1303, the object can define an edge to be followed by the robot 100 in the edge following mode. The edge can be contiguous to a current edge that the robot 100 is following. In some implementations, the object can define an edge that the robot 100 can avoid if the robot 100 is navigated along an arc away from the object. In such implementations, the robot 100 can be controlled to continue to follow the current edge in a substantially similar direction, with small deviations through arc trajectories to navigate about the object. Closer objects can result in arcs with larger turn radii so that the robot 100 can avoid the object. In some implementations, if an object is located in a sector away from the edge being followed by the robot 100, the controller 109 can determine an edge following trajectory to move the robot 100 along an arc toward the edge being followed so that the robot 100 can avoid the object. In the implementations in which the object is detected in the sectors 1301-1303, the angle of the arc trajectory determined by the controller 109 can depend on a location of the object relative to the lines 1311-1313.

In some implementations, at the operation 1214, if an object is located in one of the sectors 1304-1307, the controller 109 can determine an edge following trajectory to move toward the edge being followed by the robot 100. Such a trajectory can maintain a position of the robot 100 along the edge if the object is located in one of the sectors adjacent to the edge being followed. Alternatively, if the object is located in one of the side sectors away from the edge being followed, such a trajectory can allow the robot 100 to avoid the object. The edge following trajectory in such cases can include a small arc toward the edge. In the event that such an arc would result in contact between the object defining the edge being followed by the robot 100 and the robot 100, an obstacle avoidance trajectory could be selected at the operation 1218 (discussed below) so that the robot 100 can be controlled to avoid contact with the object.

In some implementations, at the operation 1214, if no object is detected above the floor surface 10 in any of the sectors 1301-1307, the controller 109 can determine an edge following trajectory that involves a sharp rotational arc, e.g., a 90 degree arc, toward the edge that was being followed. Such a trajectory can, for example, allow the robot 100 to continue following the edge around a sharp corner that may not be detectable by sensors of the robot 100 due to a position of the robot 100 relative to the sharp corner.

At an operation 1216, the controller 109 can determine whether the edge following trajectory will cause collision between the robot 100 and an object in the space 20, including an object defining the edge being followed by the robot 100. This determination can be made in ways similar to those discussed in this disclosure, e.g., at the operations 504, 604, 610, 908.

If the controller 109 determines that the edge following trajectory will not cause collision, the process 1200 can proceed to an operation 1220. At the operation 1220, the edge following trajectory is selected, and then the process 1200 proceeds to the operation 1202 where the robot 100 is controlled to move along the edge following trajectory.

If the controller 109 determines that the trajectory will cause collision, the process 1200 can proceed to an operation 1212 or an operation 1218. The process 1200 can proceed to the operation 1212 if an alternative obstacle avoidance trajectory cannot be selected at the operation 1218.

At the operation 1218, the controller 109 determines alternative obstacle avoidance trajectories and then selected one of the alternative obstacle avoidance trajectories. The determination of the alternative obstacle avoidance trajectories can involve processes similar to those discussed with respect to the operations 608, 610. For example, the alternative obstacle avoidance trajectories can include exploration trajectories, adjustment trajectories, and template trajectories, with the exploration and adjustment trajectories having values for parameters of the drive system of the robot 100 centered around the edge following trajectory. The selection of one of the alternative obstacle avoidance trajectories can involve processes similar to those discussed with respect to the operations 612, 614. In some implementations for the operation 1218, since the controller 109 may not have particular waypoints and defined paths for moving the robot 100, the scoring process for selecting one of the alternative obstacle avoidance trajectories may differ from the scoring processes discussed with respect to the operations 608, 610. For example, rather than comparing the alternative trajectories to a waypoint, to a planned path, or to a heading of the planned path, the controller 109 can compare the trajectories to the edge following trajectory selected at the operation 1214. In particular, the controller 109 can compare parameters of the drive system of the robot 100 (e.g., speed parameters for drive wheels of the robot 100) for the edge following trajectory and the different alternative obstacle avoidance trajectories. The score for an obstacle avoidance trajectory that is most similar to the edge following trajectory (or deviates the least from the edge following trajectory) is highest. The controller 109 at the operation 1218 can select the highest scoring obstacle avoidance trajectory and then control the robot 100 to move along this trajectory at the operation 1202.

If the controller 109 determines that the trajectory will cause collision but no alternative trajectory that would avoid collision is available (e.g., as determined at the operation 1218), the process 1200 can proceed to the operation 1212 where, as discussed above, the robot 100 can be rotated to provide a different detection area for the sensor system of the robot 100, e.g., the ranging sensor of the robot 100, and can result in a different selected trajectory at the operations 1218, 1220.

In the examples described with respect to the process 1200, in some implementations, the controller 109 can determine the edge following trajectories at a first frequency and can determine the obstacle avoidance trajectories at a second frequency. For example, the controller 109 can include a first module that determines the edge following trajectories at the first frequency as the robot 100 is moved about the space 20, and can include a second module that determines the obstacle avoidance trajectories at a second frequency as the robot 100 is moved about the space 20. The first frequency can be higher than the second frequency. For example, the first frequency can be between 40 and 80 Hz, while the second frequency can be between 10 and 30 Hz. In such implementations where these trajectories are being operated at differing frequencies, the determined obstacle avoidance trajectory may result in motion that is inconsistent with the determined edge following trajectory (due to the lower frequency process for determining the obstacle avoidance trajectory).

The process 1200 can include operations to handle inconsistencies between the determined edge following trajectory and the determined obstacle avoidance trajectory. For example, at the operation 1214, the edge following trajectory and the obstacle avoidance trajectory can both be determined, with the highest scoring obstacle avoidance trajectory being selected based on the processes described with respect to the operations 608-614. The edge following trajectory and the obstacle avoidance trajectory can each be classified into a corresponding one of the discrete states described in this disclosure (e.g., a forward movement state, a backward movement state, a state corresponding to rotation toward an edge being followed by the robot 100 in the edge following mode, a state corresponding to rotation away from the edge being followed by the robot 100 in the edge following mode, and a state corresponding to a trajectory that swerves the robot 100 away from the edge being followed by the robot 100). If the obstacle avoidance trajectory is classified as a state that differs from the state of the edge following trajectory, the process 1200 can override the obstacle avoidance trajectory and control the robot 100 to move along the edge following trajectory. If the obstacle avoidance trajectory is classified as the same state as the edge following trajectory, then the controller 109 can select the obstacle avoidance trajectory, e.g., at the operation 1218. In some cases, as discussed in this disclosure, no alternative obstacle avoidance trajectory is available, and the robot 100 can be controlled to rotate in place at the operation 1212. If no collision for the edge following trajectory is detected at the operation 1216, then the process 1200 proceeds as normal to the operation 1220 with the controller 109 selecting the edge following trajectory for navigating the robot 100 at the operation 1202.

Further Alternative Implementations

A number of implementations have been described. While this specification contains many specific implementation details, these should not be construed as limitations on the scope of what is being claimed, which is defined by the claims themselves, but rather as descriptions of features that may be specific to particular implementations of particular inventions. It will be understood that various modifications may be made.

The subject matter and the actions and operations of the controller 109 and other operations described in this specification can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively or in addition, the carrier can be an artificially generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device, e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

While operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products. Furthermore, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

While the robot 100 is described as being an autonomous cleaning robot including a vacuum system, the robot 100 may vary in implementations. In some implementations, the robot 100 is a mopping robot, a scrubbing robot, or another type of autonomous cleaning robot. In some implementations, rather than being an autonomous cleaning robot, the robot 100 is another type of autonomous mobile robot, such as a patrol robot, an air purifying robot, or other robot operable in an indoor environment. In some implementations, the robot 100 is an autonomous mobile robot is a robot that operates in an outdoor environment, such as a robotic lawnmower.

Figure 14A:
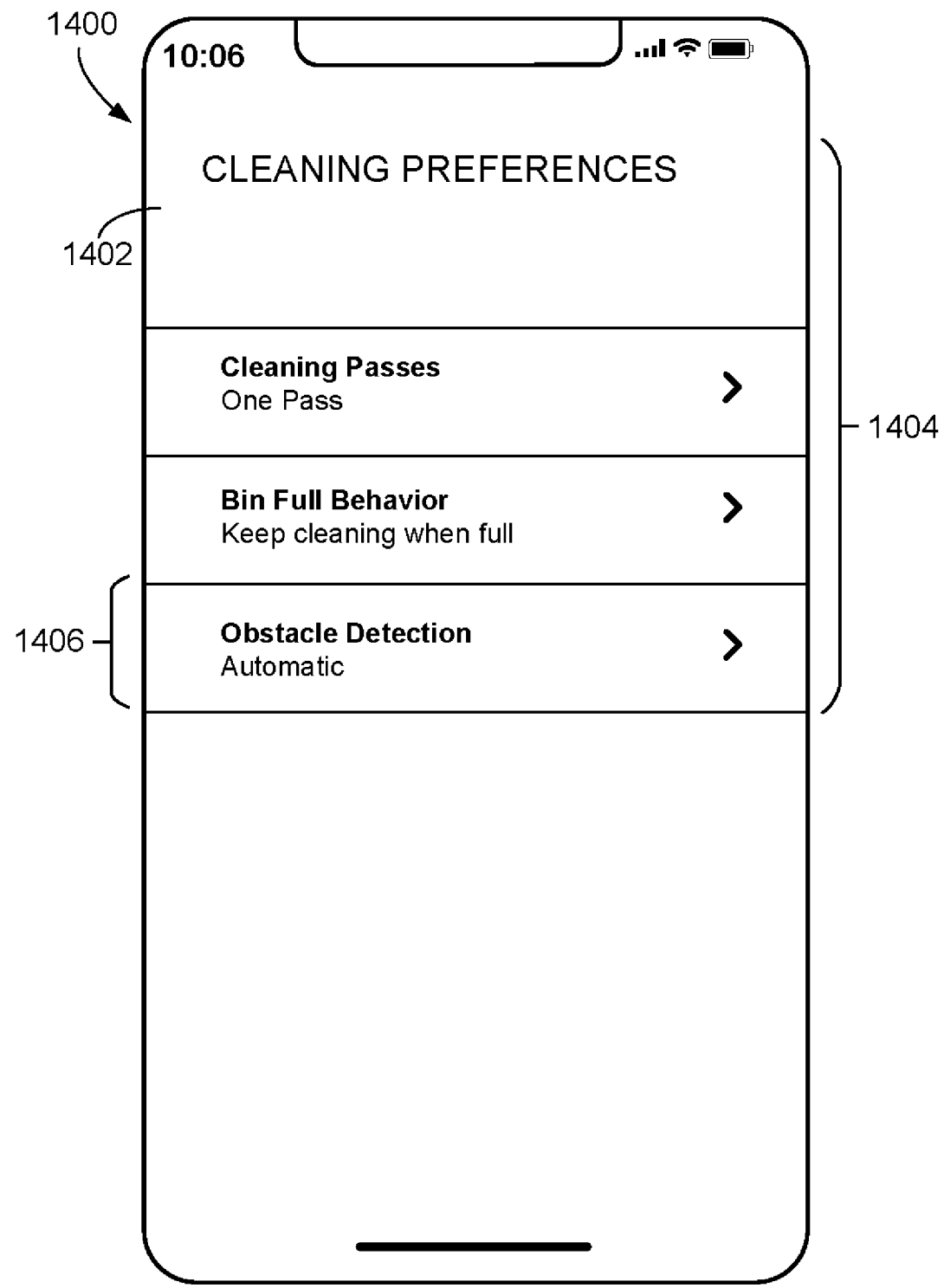
FIGS. 14A-14B are front views of a mobile device.
Figure 14B:
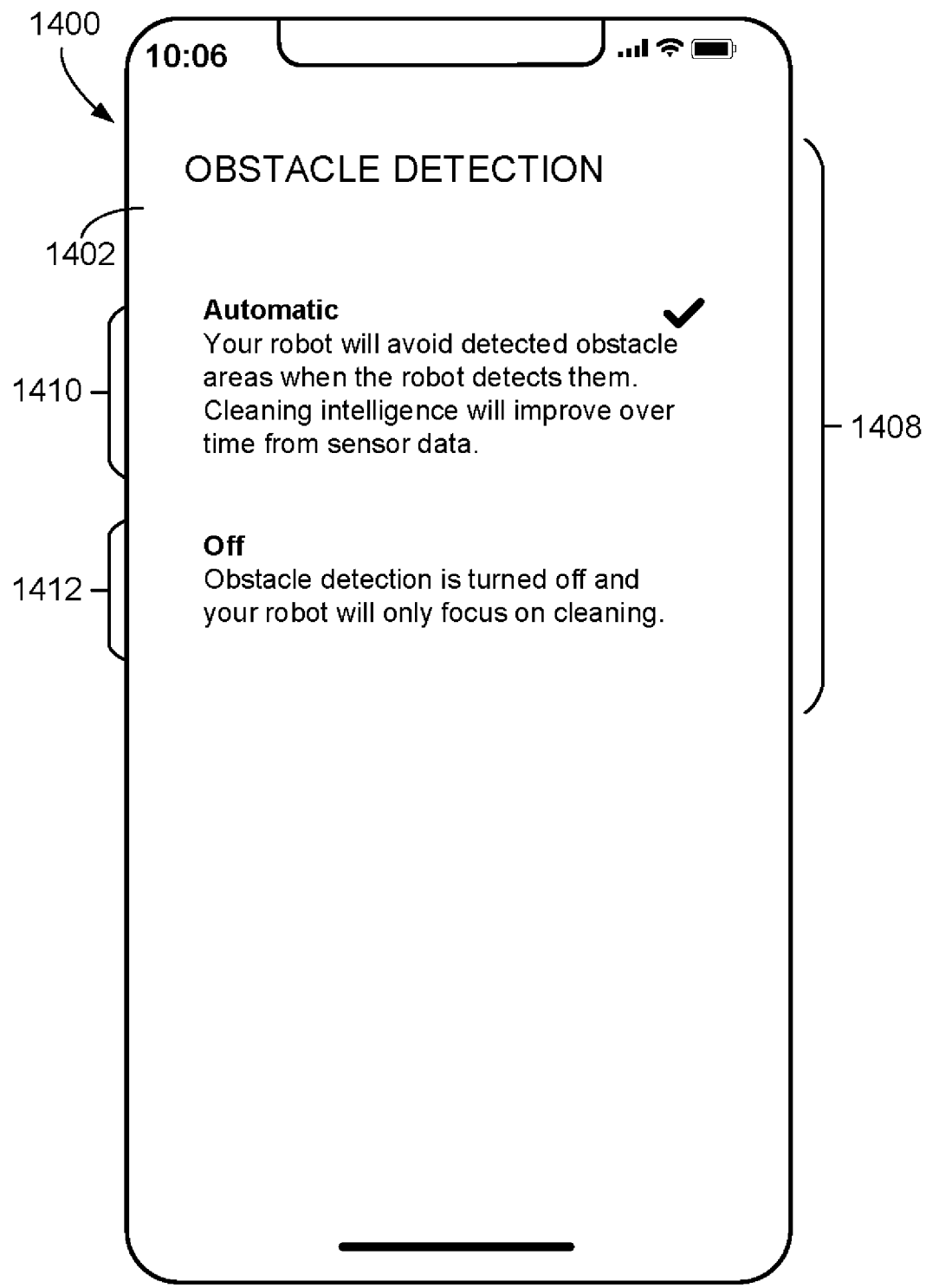

In some implementations, the robot 100 can include multiple obstacle avoidance modes. In a first obstacle avoidance mode, the robot 100 uses the local map to detect obstacles, as discussed in this disclosure. The robot 100 can select trajectories that avoid contact between the robot 100 and an obstacle, thus reducing impacts forces on the obstacle. In a second obstacle avoidance mode, the robot 100 uses a bump sensor of the robot 100 to detect the obstacle. In this regard, the robot 100 contacts the obstacle to detect the obstacle. In some implementations, a user can operate a user device, e.g., a smartphone, a computer, a mobile device, or other user computing device, to select a setting of the robot 100 for determining which obstacle avoidance mode should be used. For example, one setting selectable using the user device can be a global gentle clean mode in which the robot 100 generally operates in the first obstacle avoidance mode to avoid obstacles except in overriding circumstances. Referring to FIG. 14A, a mobile device 1400, e.g., a smartphone, can provide a settings menu 1404 on its display 1402. The settings menu 1404 can provide a list of cleaning preferences selectable by a user of the mobile device 1400. The list of cleaning preferences can include a setting for obstacle detection. An affordance 1406 is selectable by the user to bring the user to a menu for selecting the setting of the obstacle detection. Referring to FIG. 14B, the mobile device 1400 can then provide settings menu 1408 on its display 1402. The settings menu 1408 can provide a list of selectable settings for the obstacle detection setting. The user can select an affordance 1410 for selecting an "automatic" setting in which the robot 100 is allowed to operate in a mode to avoid contacting obstacles on a floor surface. In particular, this setting can allow the robot 100 to operate in a gentle mode. Alternatively, the user can select an affordance 1412 to turn off the "automatic" setting. With this setting, for example, the robot 100 can be operated to contact obstacle to detect the obstacle as the robot 100 is navigated about the obstacle. With the affordance 1412 selected, the gentle mode of the robot 100 is not initiated during a cleaning mission.

In some implementations of the global gentle clean mode, the overriding circumstances that can cause the robot 100 to initiate the second obstacle avoidance mode can vary. An overriding circumstance can include, for example, a circumstance in which the local map of the robot 100 indicates that the robot 100 is restricted to an area of the space 20 by one or more obstacles after the robot 100 has traveled from outside of the area to inside of the area. This could occur, for example, due to an erroneous detection of an obstacle, or a change in state of an object in the space 20 that would cause the robot 100 to determine that an obstacle is blocking the robot 100 in the area (e.g., a rug or a bath mat bends as the robot 100 travels over it, and the deformed portion causes the robot 100 to detect an obstacle). In this circumstance, the robot 100 can initiate the second obstacle avoidance mode to allow the robot 100 to contact objects to confirm that the objects are indeed obstacles. In some implementations, a user can select a setting that disables the first obstacle avoidance mode and only allow the robot 100 to operate in the second obstacle avoidance mode. In some implementations, a user can select a setting for a minimum edge following distance or a minimum obstacle clearance distance for the robot 100. For example, when the robot 100 avoids an obstacle or follows an edge of the obstacle, the robot 100 can be controlled to maintain a distance from the obstacle. In some implementations, this distance is user-selectable. The distance can be selected to be between 0 and 2 centimeters, e.g., a distance less than 2 centimeters, a distance less than 1 centimeter, less than 0.5 centimeters.

A number of implementations have been described. Nevertheless, it will be understood that various modifications may be made. Accordingly, other implementations are within the scope of the claims.

What is claimed is:

1. An autonomous cleaning robot comprising:
   a drive system operable to move the autonomous cleaning robot about a floor surface;
   a cleaning inlet on a bottom portion of the autonomous cleaning robot, wherein the autonomous cleaning robot is configured to draw debris into the autonomous cleaning robot through the cleaning inlet;
   a ranging sensor directed toward a portion of the floor surface forward of the autonomous cleaning robot and configured to measure a position of an obstacle on the portion of the floor surface relative to the autonomous cleaning robot; and
   a controller configured to execute instructions to perform operations, the operations comprising:
   while moving the autonomous cleaning robot along a first portion of a path toward a waypoint, detecting, with the ranging sensor, the obstacle along the path between the first portion of the path and a second portion of the path,
   navigating the autonomous cleaning robot about the obstacle along a trajectory that maintains at least a clearance distance between the autonomous cleaning robot and the obstacle, and
   moving the autonomous cleaning robot along the second portion of the path, wherein navigating the autonomous cleaning robot about the obstacle comprises
   determining a plurality of selectable alternative trajectories to avoid the obstacle,
   selecting, from the plurality of selectable alternative trajectories, the trajectory based on at least distances between the plurality of selectable alternative trajectories and the waypoint, and
   navigating the autonomous cleaning robot along the selected trajectory.

2. The autonomous cleaning robot of claim 1, wherein the portion of the floor surface corresponds to an area on the floor surface forward of the autonomous cleaning robot and extending across at least a width of the autonomous cleaning robot.

3. The autonomous cleaning robot of claim 1, wherein:
   the operations comprise initiating a coverage routine in which the autonomous cleaning robot moves along a plurality of rows, and
   the path corresponds to a row of the plurality of rows.

4. The autonomous cleaning robot of claim 1, wherein:
   the operations comprise initiating a relocation behavior in which the autonomous cleaning robot moves from a first room to a second room along the path.

5. The autonomous cleaning robot of claim 1, wherein the operations further comprise repeatedly performing iterations of the determining, the selecting, and the navigating until a condition is satisfied.

6. The autonomous cleaning robot of claim 5, wherein the condition corresponds to a position of the autonomous cleaning robot being on the path to the waypoint.

7. The autonomous cleaning robot of claim 5, wherein the condition corresponds to a minimum distance between a position of the autonomous cleaning robot and the path exceeding a threshold.

8. The autonomous cleaning robot of claim 5, wherein the condition corresponds to an amount of time elapsed during the iterations exceeding a threshold.

9. The autonomous cleaning robot of claim 1, wherein:
   selecting the trajectory of the plurality of selectable alternative trajectories based on at least the distances between the plurality of selectable alternative trajectories and the waypoint comprises:
   computing scores for the plurality of selectable alternative trajectories as a function of at least the distances.

10. The autonomous cleaning robot of claim 9, wherein:
   the distances are first distances, and
   computing the scores comprises:
   computing the scores for the plurality of selectable alternative trajectories as a function of at least (i) the first distances and (ii) second distances between the plurality of selectable alternative trajectories and the path.

11. The autonomous cleaning robot of claim 10, wherein:
   computing the scores comprises:
   computing the scores for the plurality of selectable alternative trajectories as a function of at least (i) the first distances, (ii) the second distances, and (iii) headings of the plurality of selectable alternative trajectories.

12. The autonomous cleaning robot of claim 1, wherein the operations further comprise repeatedly performing iterations of the determining, the selecting, and the navigating.

13. The autonomous cleaning robot of claim 1, wherein the plurality of selectable alternative trajectories comprises one or more template trajectories.

14. The autonomous cleaning robot of claim 13, wherein: the one or more template trajectories comprises at least one of:
  a first template trajectory in which the autonomous cleaning robot is rotated in place as an entirety of the first template trajectory, or
  a second template trajectory in which the autonomous cleaning robot is moved along a predetermined arc.

15. The autonomous cleaning robot of claim 1, wherein determining the plurality of selectable alternative trajectories comprises:
  determining a selected trajectory of a last iteration of trajectory determination; and
  modifying at least one parameter associated with the selected trajectory of the last iteration, to obtain at least one of the plurality of selectable alternative trajectories.

16. The autonomous cleaning robot of claim 15, wherein modifying the at least one parameter associated with the selected trajectory of the last iteration comprises varying the at least one parameter over a range that includes a value of the at least one parameter for the selected trajectory of the last iteration.

17. The autonomous cleaning robot of claim 16, wherein the range is less than a total range associated with the drive system.

18. The autonomous cleaning robot of claim 16, wherein the at least one parameter is varied to have multiple values spaced at a fixed interval within the range, to obtain multiple selectable alternative trajectories.

19. The autonomous cleaning robot of claim 15, wherein the at least one parameter comprises at least one of a speed or a heading.

20. The autonomous cleaning robot of claim 1, wherein: the plurality of selectable alternative trajectories comprises a trajectory with a speed associated with the trajectory and a heading associated with the trajectory, the speed associated with the trajectory and the heading associated with the trajectory corresponding, respectively, to a current speed and a current heading of the autonomous cleaning robot with an adjustment.

21. The autonomous cleaning robot of claim 1, wherein navigating the autonomous cleaning robot about the obstacle comprises:
  rotating the autonomous cleaning robot in place.

22. The autonomous cleaning robot of claim 21, wherein: navigating the autonomous cleaning robot about the obstacle comprises:
  detecting the presence of the obstacle in a first area surrounding the autonomous cleaning robot, and
  detecting the presence of the obstacle in a second area offset from the first area; and
  rotating the autonomous cleaning robot in place comprises rotating the autonomous cleaning robot in place away from the second area in response to detecting the presence of the obstacle in the first area and the second area.

23. The autonomous cleaning robot of claim 21, wherein: navigating the autonomous cleaning robot about the obstacle comprises:
  detecting the presence of the obstacle in a first area surrounding the autonomous cleaning robot,
  detecting the presence of the obstacle in a second area offset from the first area, and
  moving the autonomous cleaning robot away from the obstacle in response to detecting the presence of the obstacle in the first area and the second area; and
  rotating the autonomous cleaning robot in place comprises rotating the autonomous cleaning robot in place after moving the autonomous cleaning robot away from the obstacle.

24. The autonomous cleaning robot of claim 1, wherein the obstacle is a first obstacle, and the operations comprise:
  initiating an edge following mode to move the autonomous cleaning robot along an edge of a second obstacle above the floor surface, and
  maintaining at least the clearance distance between the autonomous cleaning robot and the second obstacle as the autonomous cleaning robot is moved along the edge.

25. The autonomous cleaning robot of claim 24, wherein maintaining at least the clearance distance between the autonomous cleaning robot and the second obstacle comprises:
  determining edge following trajectories at a first frequency,
  determining obstacle avoidance trajectories at a second frequency less than the first frequency,
  determining that one of the edge following trajectories results in contact between the autonomous cleaning robot and the second obstacle, and
  navigating the autonomous cleaning robot along a selected obstacle avoidance trajectory of the obstacle avoidance trajectories in response to determining that one of the edge following trajectories results in contact between the autonomous cleaning robot and the second obstacle.

26. The autonomous cleaning robot of claim 24, wherein the edge following mode is a first edge following mode, and the operations comprise:
  initiating a second edge following mode in which the autonomous cleaning robot is moved along an edge based on detection of the edge using a bump sensor of the autonomous cleaning robot.

27. The autonomous cleaning robot of claim 24, wherein maintaining at least the clearance distance between the autonomous cleaning robot and the second obstacle comprises:
  determining edge following trajectories at a first frequency, and
  determining obstacle avoidance trajectories at a second frequency less than the first frequency.

28. A method comprising:
  while moving an autonomous cleaning robot along a first portion of a path toward a waypoint, detecting, with a ranging sensor of the autonomous cleaning robot, an obstacle forward of the autonomous cleaning robot along the path between the first portion of the path and a second portion of the path,
  navigating the autonomous cleaning robot about the obstacle along a trajectory, and
  moving the autonomous cleaning robot along the second portion of the path, wherein navigating the autonomous cleaning robot about the obstacle comprises
  determining a plurality of selectable alternative trajectories to avoid the obstacle,
  selecting, from the plurality of selectable alternative trajectories, the trajectory based on at least distances between the plurality of selectable alternative trajectories and the waypoint, and
  navigating the autonomous cleaning robot along the selected trajectory.

29. The method of claim 28, wherein detecting, with the ranging sensor, the obstacle forward of the autonomous cleaning robot along the path comprises detecting the obstacle without contact between the autonomous cleaning robot and the obstacle.

30. The method of claim 28, comprising initiating a coverage routine in which the autonomous cleaning robot moves along a plurality of rows,
  wherein the path corresponds to a row of the plurality of rows.

31. The method of claim 30, comprising initiating a relocation behavior in which the autonomous cleaning robot moves from a first room to a second room along the path.

32. One or more non-transitory computer readable media storing instructions executable by one or more processing devices, and upon such execution cause the one or more processing devices to perform operations comprising:
  while moving an autonomous cleaning robot along a first portion of a path toward a waypoint, detecting, with a ranging sensor of the autonomous cleaning robot, an obstacle forward of the autonomous cleaning robot along the path between the first portion of the path and a second portion of the path,
  navigating the autonomous cleaning robot about the obstacle along a trajectory, and
  moving the autonomous cleaning robot along the second portion of the path,
  wherein navigating the autonomous cleaning robot about the obstacle comprises
    determining a plurality of selectable alternative trajectories to avoid the obstacle,
    selecting, from the plurality of selectable alternative trajectories, the trajectory based on at least distances between the plurality of selectable alternative trajectories and the waypoint, and
    navigating the autonomous cleaning robot along the selected trajectory.

33. The one or more non-transitory computer readable media of claim 32, wherein detecting, with the ranging sensor, the obstacle forward of the autonomous cleaning robot along the path comprises detecting the obstacle without contact between the autonomous cleaning robot and the obstacle.

34. The one or more non-transitory computer readable media of claim 32, wherein:
  the operations comprise initiating a coverage routine in which the autonomous cleaning robot moves along a plurality of rows, and
  the path corresponds to a row of the plurality of rows.

35. The one or more non-transitory computer readable media of claim 34, wherein:
  the operations comprise initiating a relocation behavior in which the autonomous cleaning robot moves from a first room to a second room along the path.

* * * * *